May 29, 1945.   H. T. AVERY   2,377,065
SELECTIVE RATIO TRANSMISSION FOR DRIVING
CALCULATING MACHINE ACTUATORS
Filed Nov. 25, 1940   15 Sheets-Sheet 1
FIG_1_
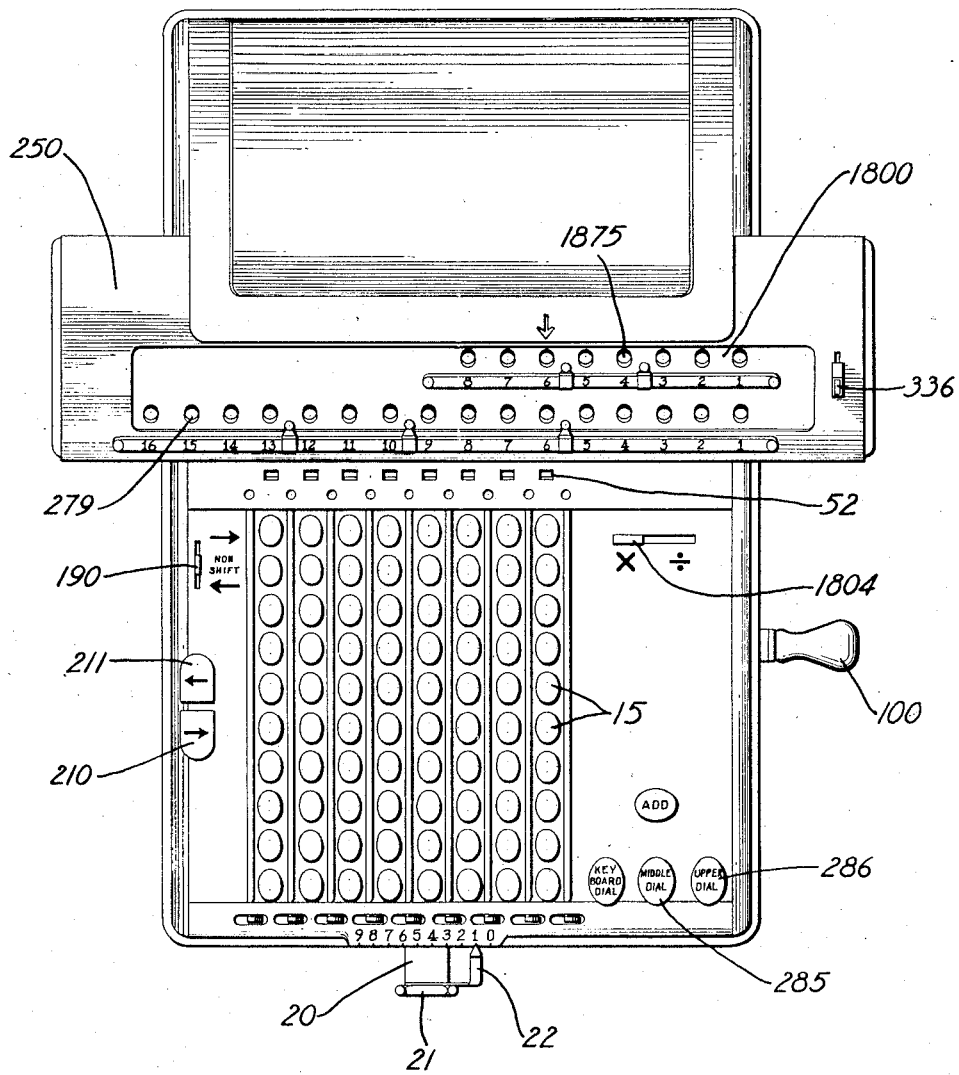
INVENTOR.
Harold T. Avery
BY Lyon & Lyon
ATTORNEYS.

May 29, 1945.   H. T. AVERY   2,377,065
SELECTIVE RATIO TRANSMISSION FOR DRIVING
CALCULATING MACHINE ACTUATORS
Filed Nov. 25, 1940   15 Sheets-Sheet 2
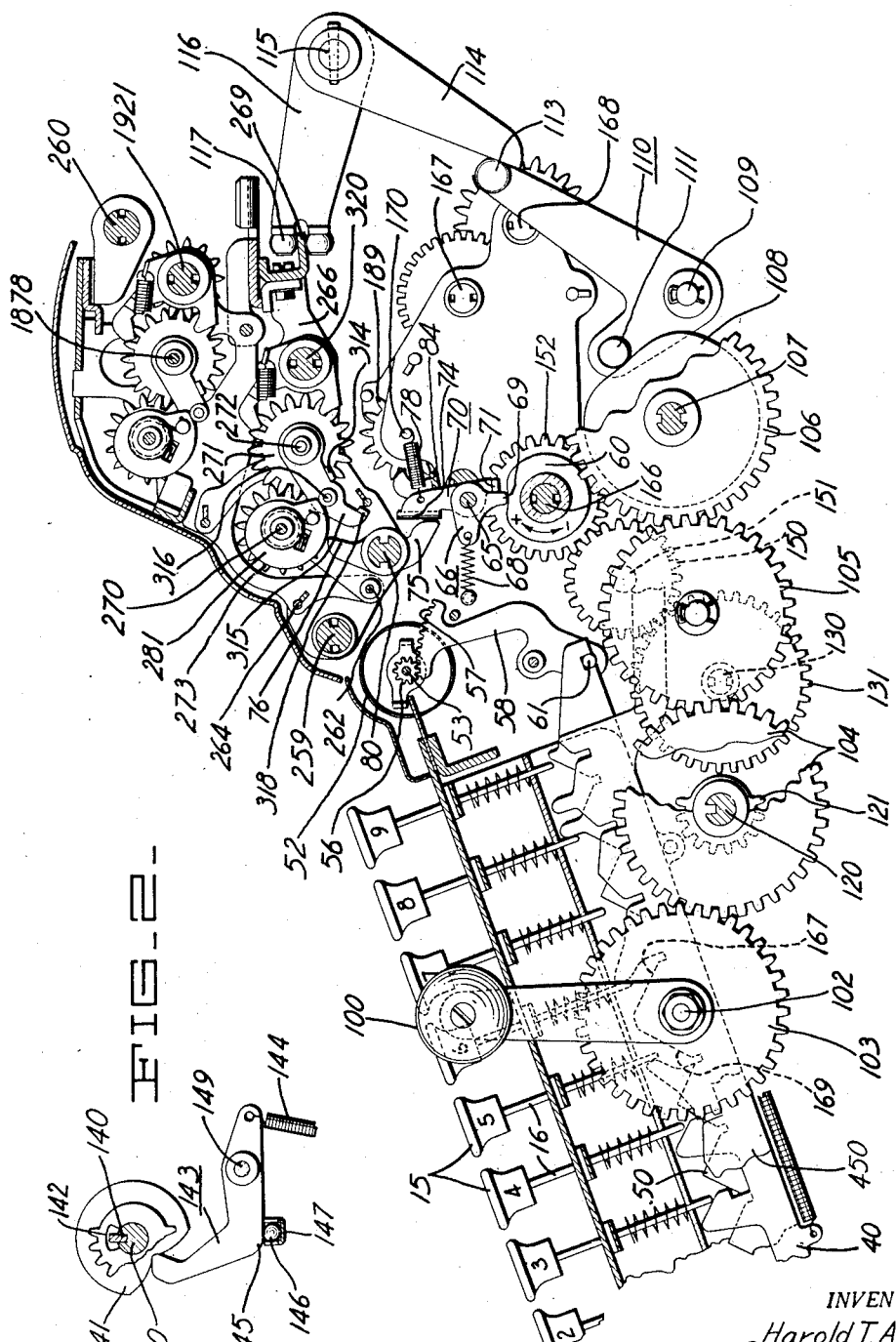
INVENTOR.
Harold T. Avery
BY
ATTORNEYS.

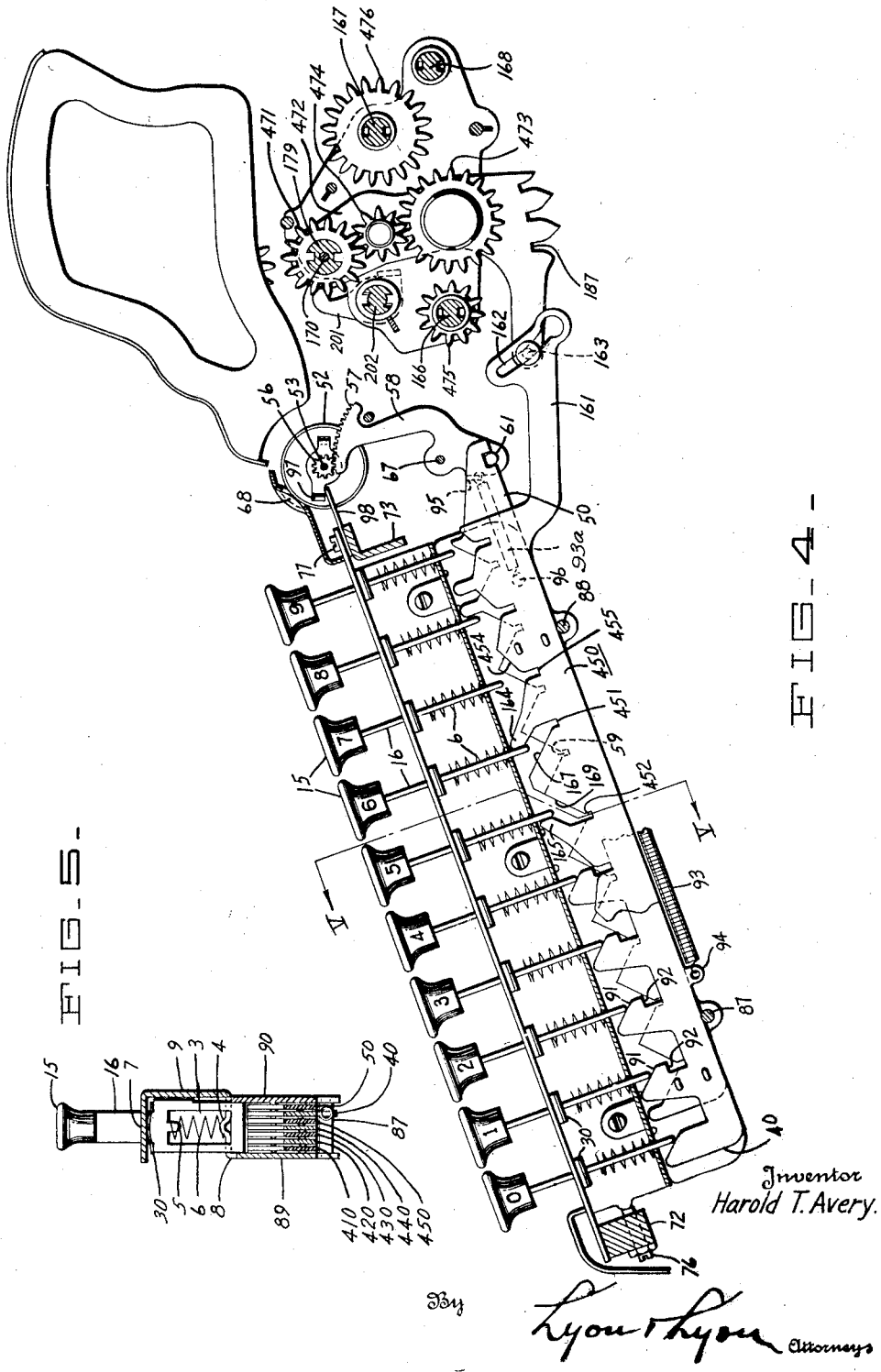

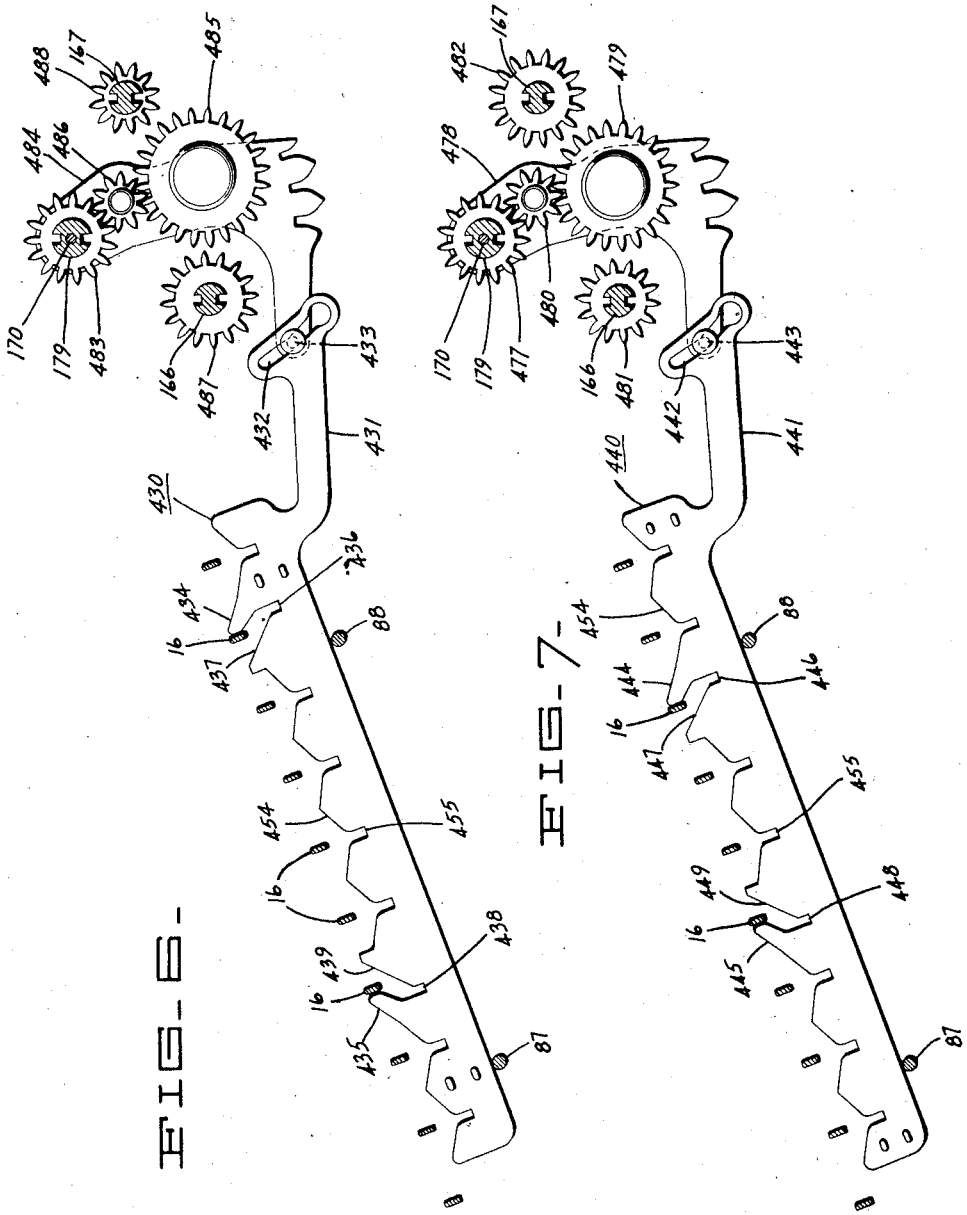

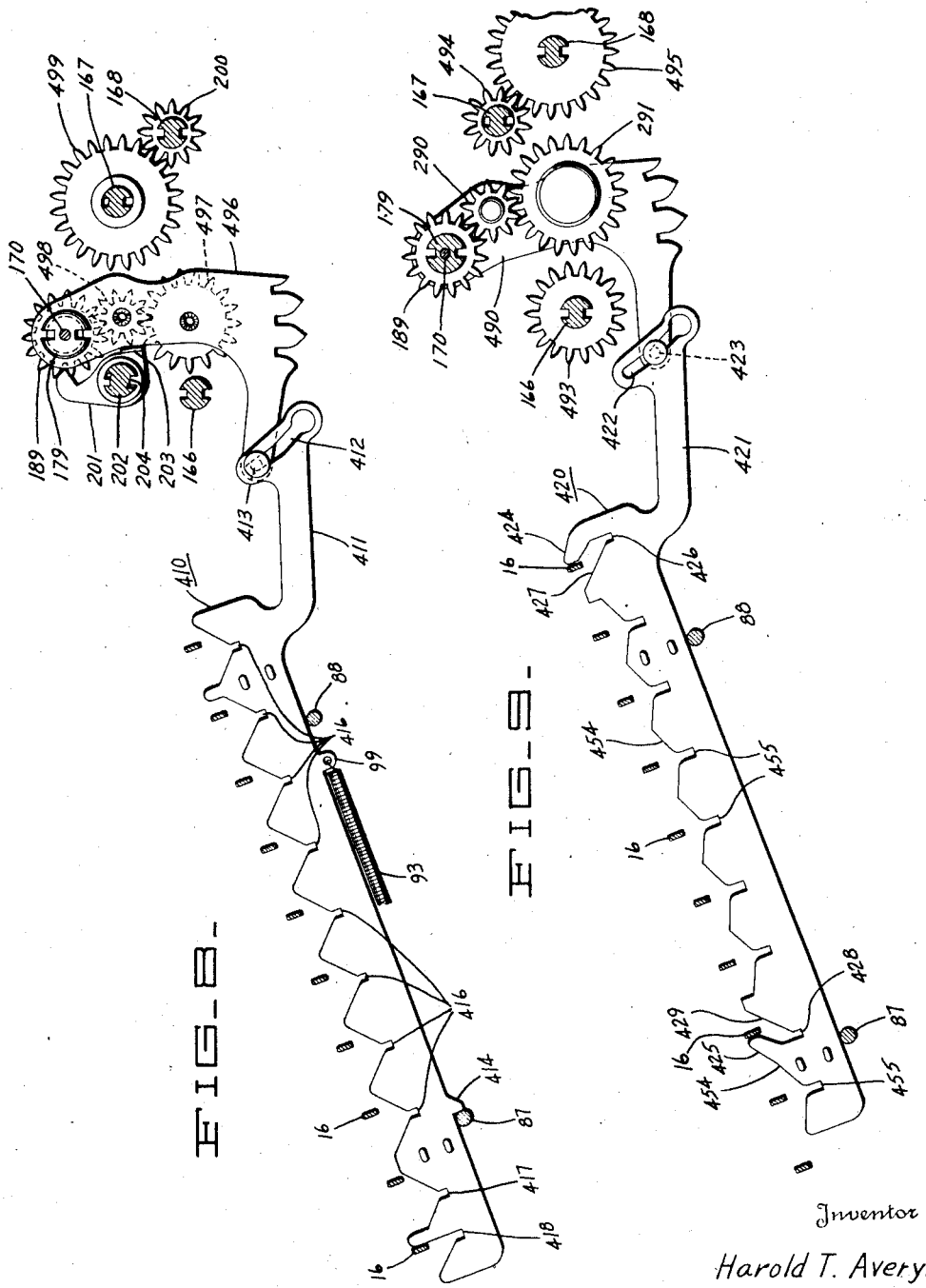

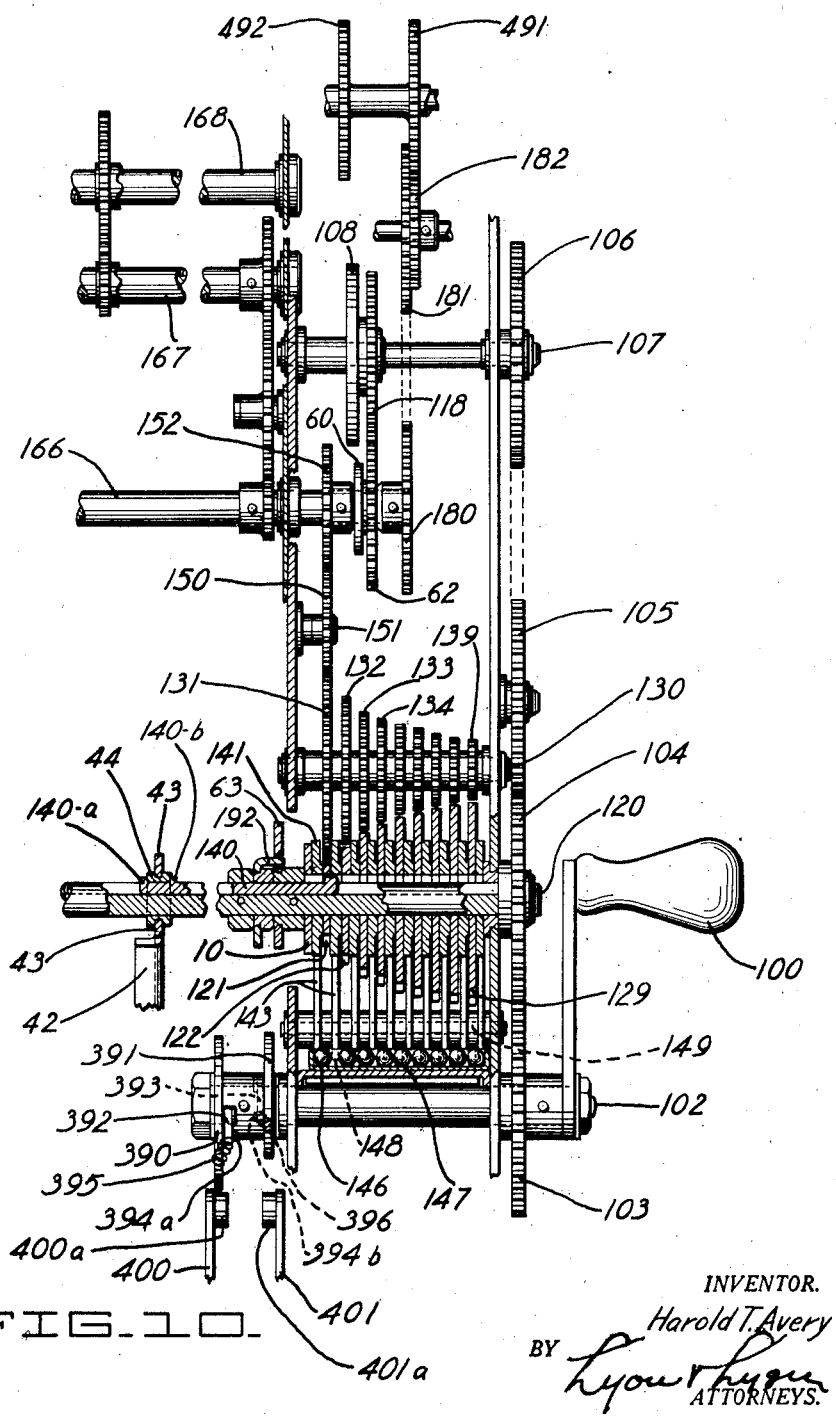

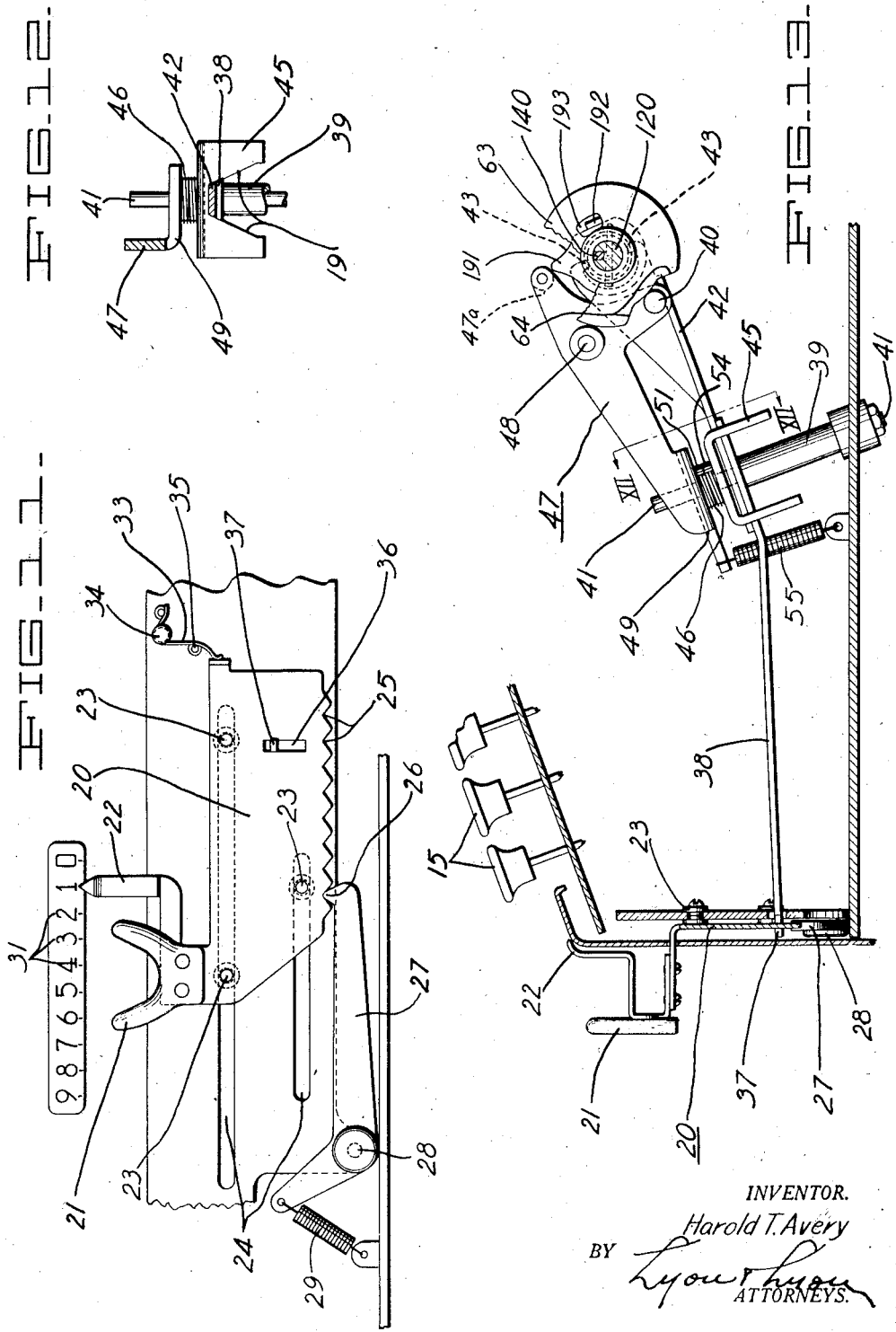

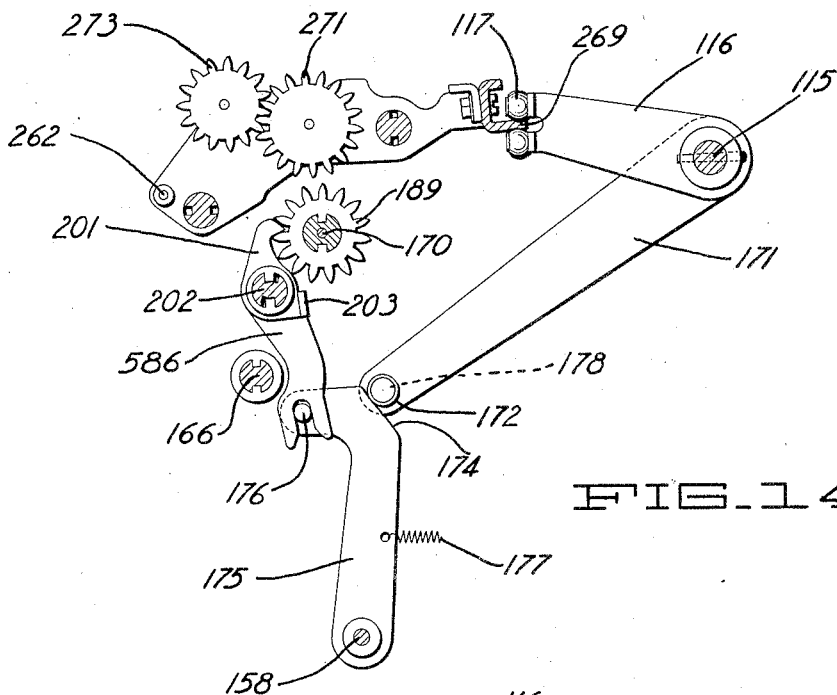
FIG_14_
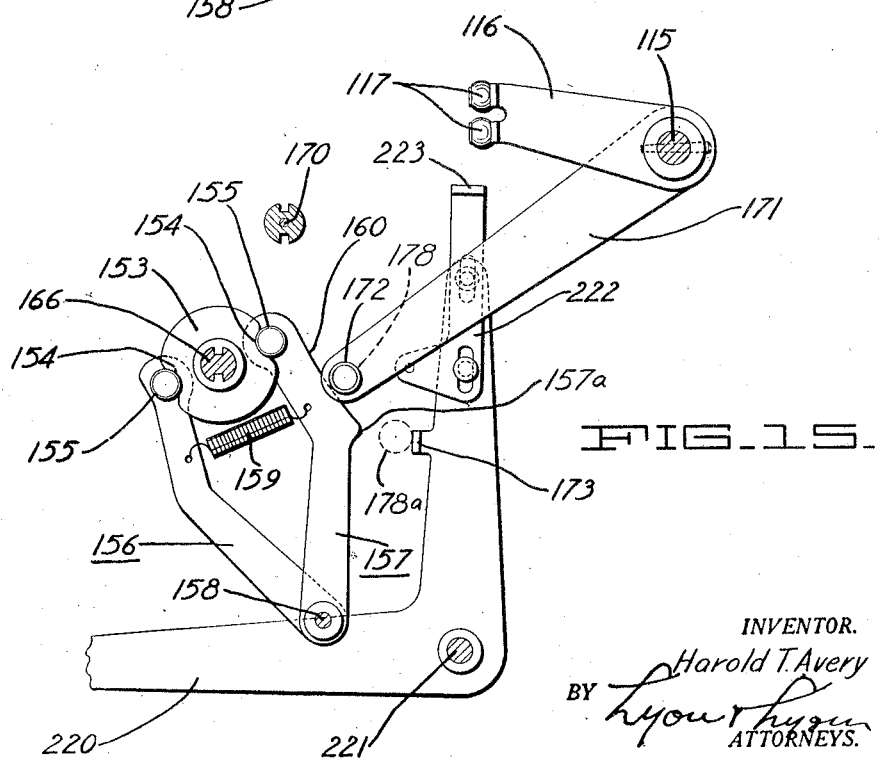
FIG_15_

May 29, 1945.  H. T. AVERY  2,377,065
SELECTIVE RATIO TRANSMISSION FOR DRIVING
CALCULATING MACHINE ACTUATORS
Filed Nov. 25, 1940    15 Sheets-Sheet 9
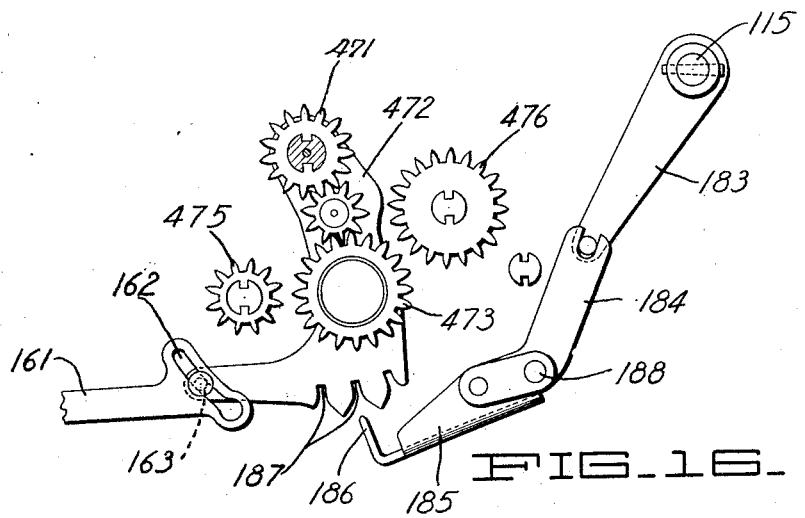
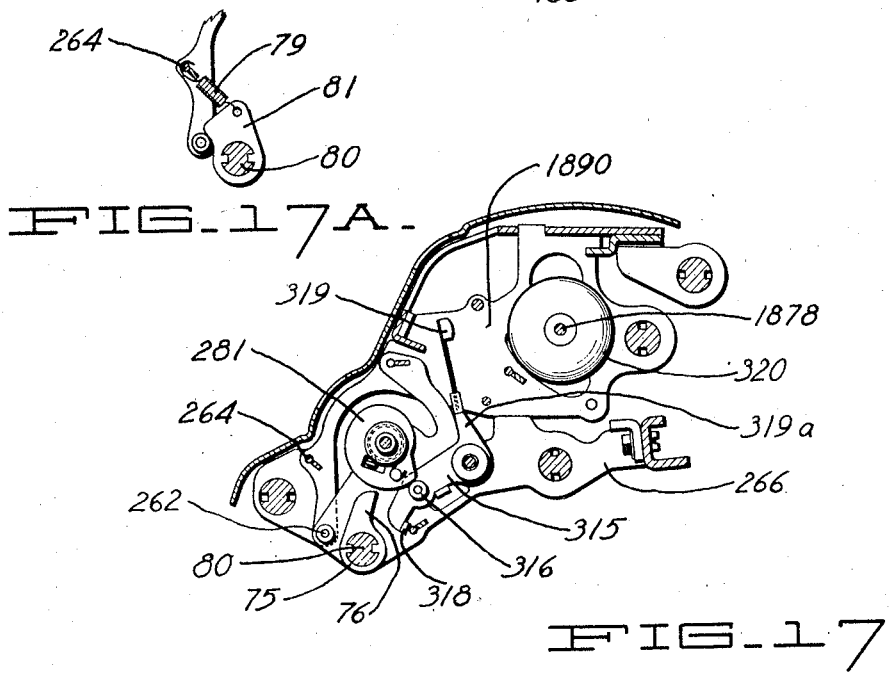
INVENTOR.
Harold T. Avery
BY Lyon & Lyon
ATTORNEYS.

May 29, 1945.  H. T. AVERY  2,377,065
SELECTIVE RATIO TRANSMISSION FOR DRIVING
CALCULATING MACHINE ACTUATORS
Filed Nov. 25, 1940   15 Sheets-Sheet 10

INVENTOR.
Harold T. Avery
BY
ATTORNEYS.

May 29, 1945.  H. T. AVERY  2,377,065
SELECTIVE RATIO TRANSMISSION FOR DRIVING
CALCULATING MACHINE ACTUATORS
Filed Nov. 25, 1940   15 Sheets-Sheet 11
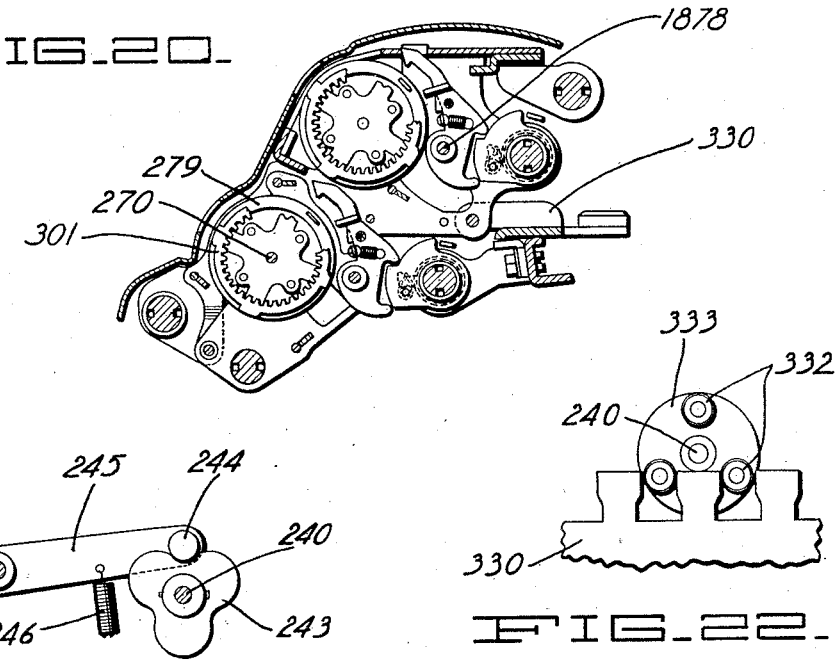
FIG_20_
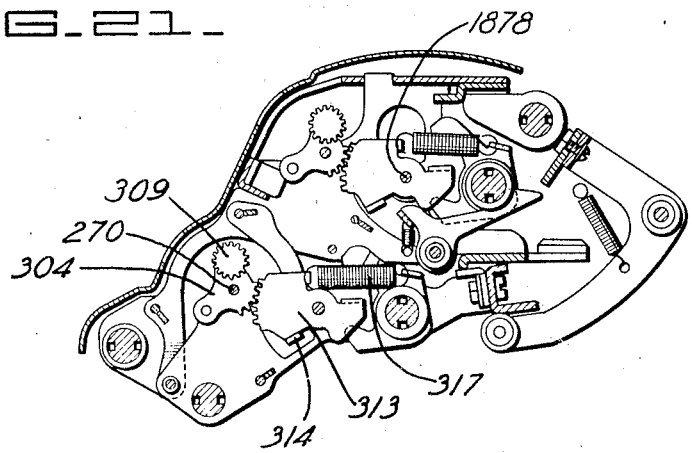
FIG_21_
FIG_22_
FIG_23_
INVENTOR.
Harold T. Avery
BY
ATTORNEYS.

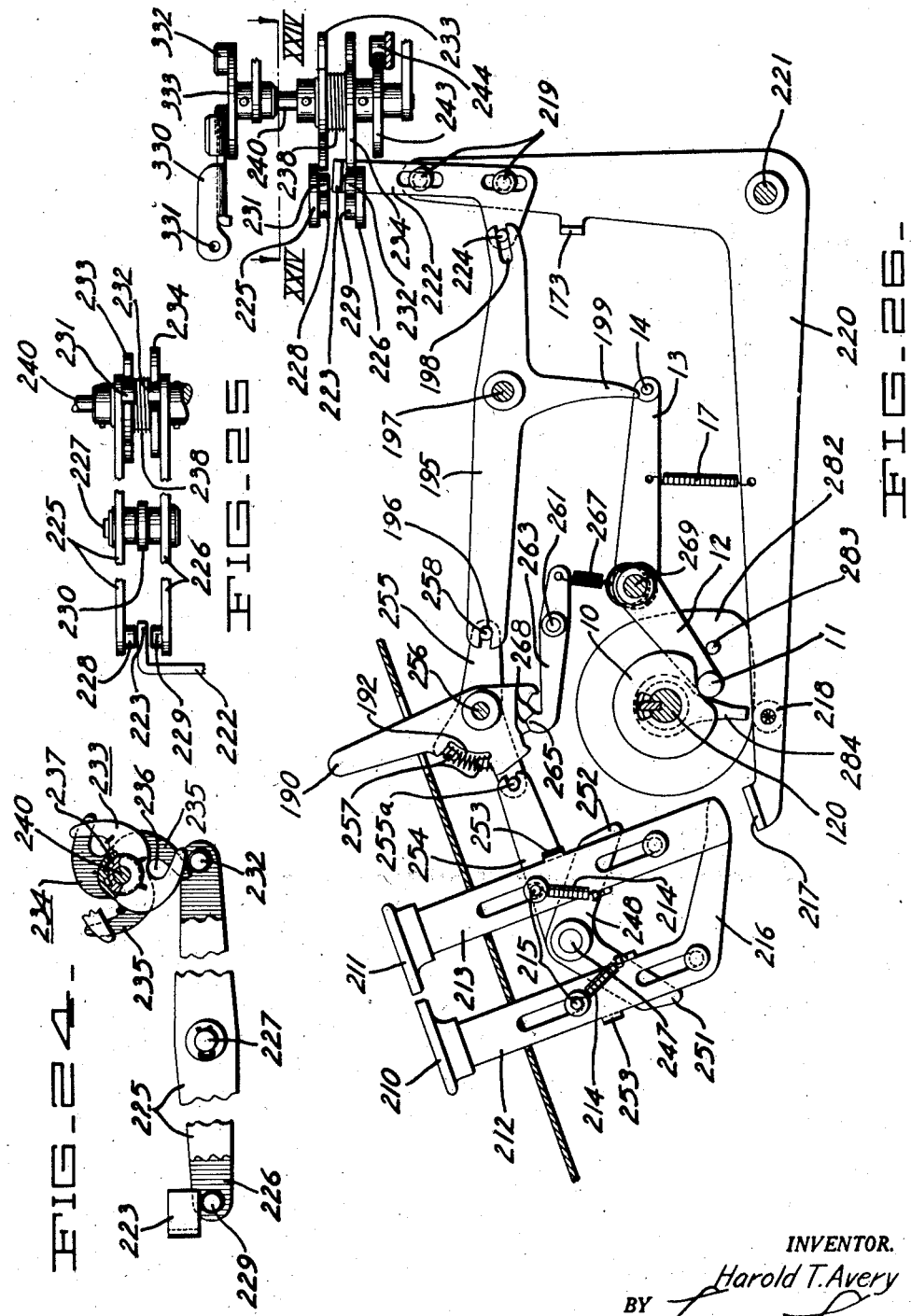

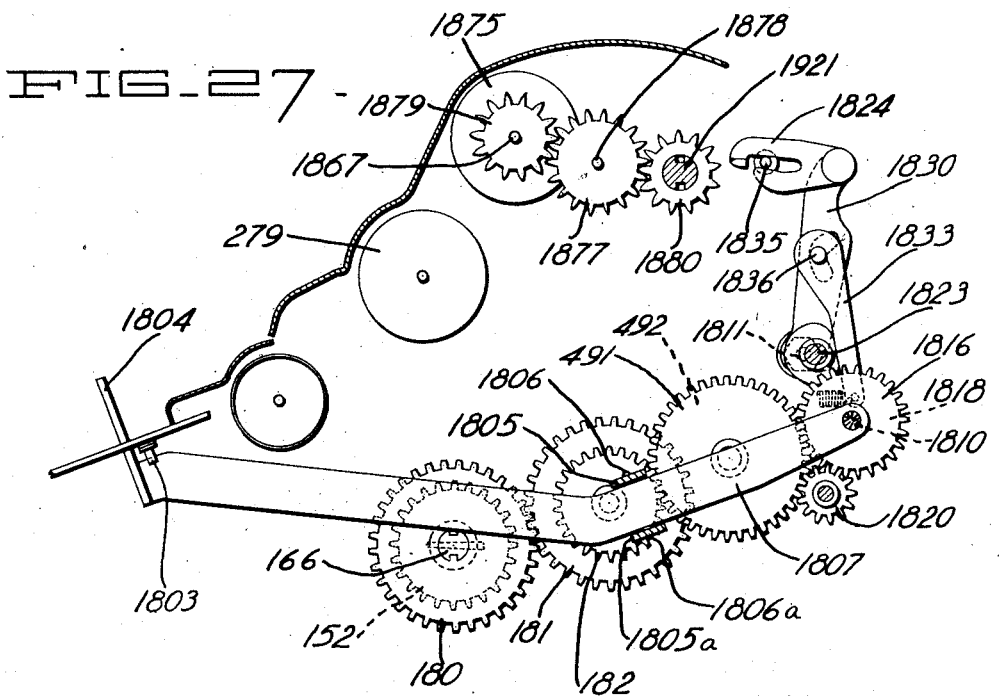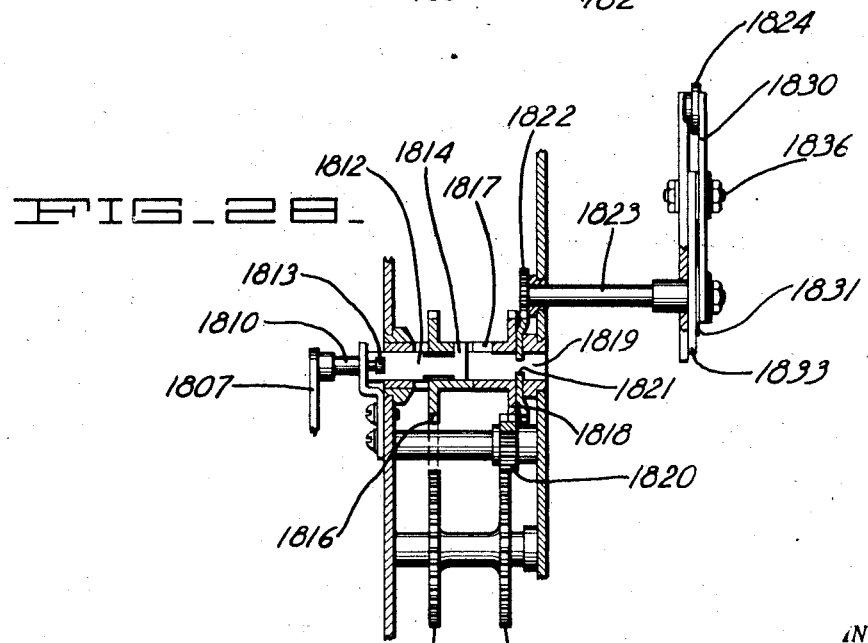

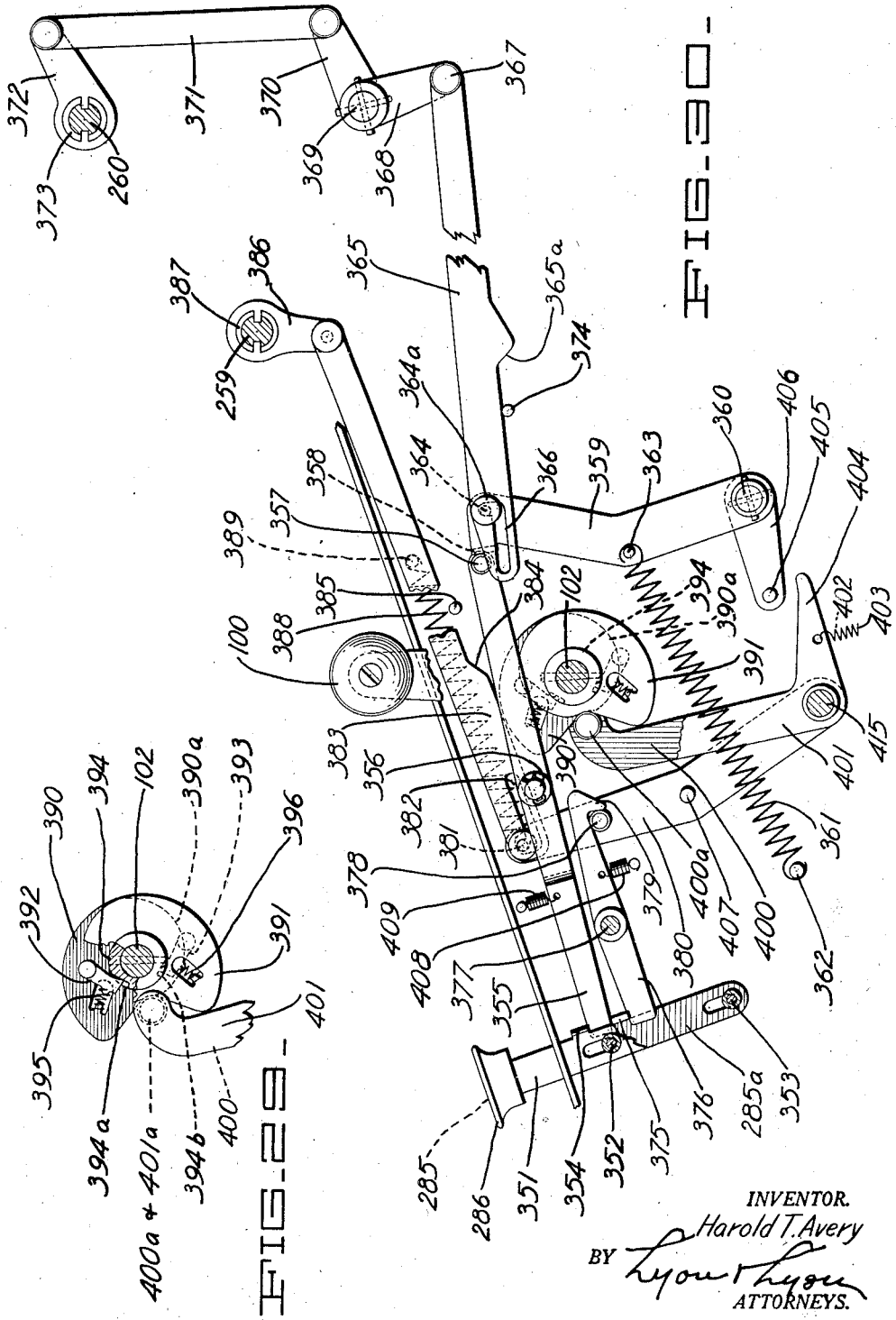

May 29, 1945.  H. T. AVERY  2,377,065
SELECTIVE RATIO TRANSMISSION FOR DRIVING
CALCULATING MACHINE ACTUATORS
Filed Nov. 25, 1940   15 Sheets-Sheet 15
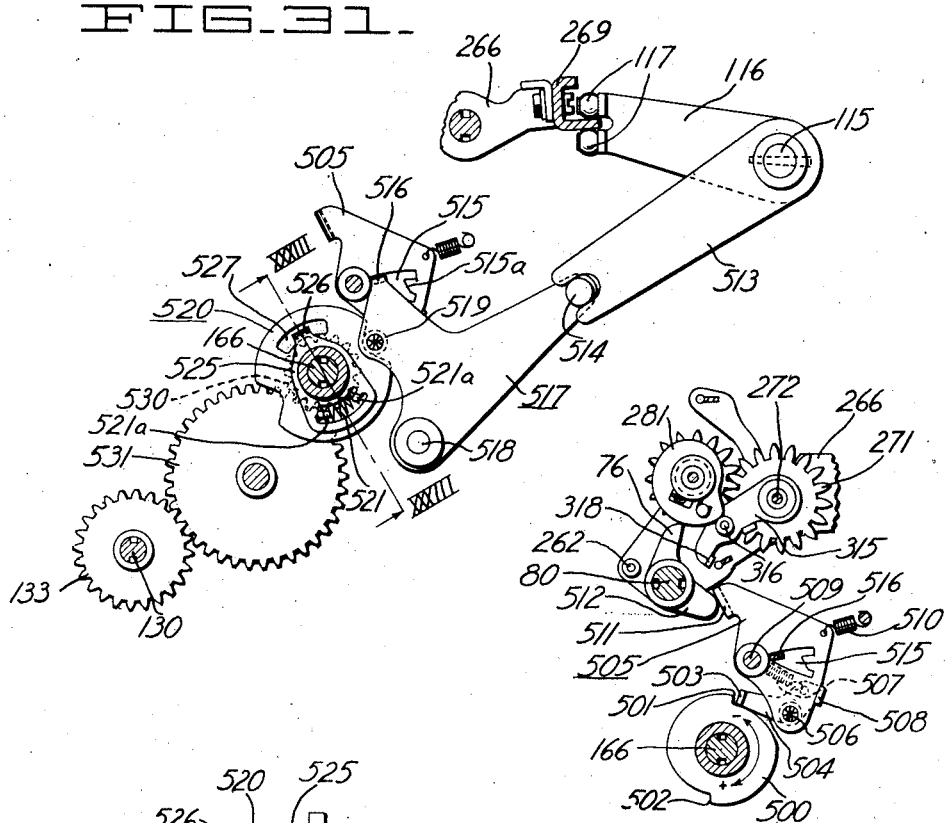
FIG. 31.
FIG. 32.
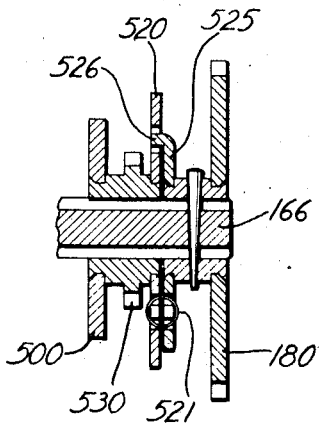
FIG. 33.
INVENTOR.
Harold T. Avery
BY Lyon Lyon
ATTORNEYS Patented May 29, 1945

2,377,065

UNITED STATES PATENT OFFICE 2,377,065

SELECTIVE RATIO TRANSMISSION FOR DRIVING CALCULATING MACHINE ACTUATORS

Harold T. Avery, Oakland, Calif., assignor to Marchant Calculating Machine Company, a corporation of California Application November 25, 1940, Serial No. 367,025

7 Claims. (Cl. 235—79)

This invention relates to a calculating machine of the type designed to perform four cardinal calculations. In the ordinary calculating machine where an entry is to be made a number of times in the accumulator register the operating member is required to make a corresponding number of operations.

One of the objects of the present invention is to provide an improved means whereby through a single operation of the operating member, such as a single rotation of a cyclically driven operating member or hand-crank, an entry may be made any selected number of times in the accumulator. For such purpose, the calculating machine of the present invention includes a series of transmission gears between the operating member or hand-crank and the actuator of the machine.

It is a further object of the present invention to embody such improvement in a continuous gear type of actuator, commercially known as the Marchant Calculating Machine, as shown for example in the Avery Patent No. 2,271,240.

The improvements of the present invention are particularly valuable for use in connection with the calculating machines driven by a hand-crank, and it is thus one object of the invention to provide a hand-crank-driven calculating machine in which multiplication can be performed by a single operation of the hand-crank.

It is a further object of this invention to provide a calculating machine in which a new multiplier setting can be made before the preceding multiplication is complete.

It is a further object of the invention to provide a means operated by the driving member of the machine for actuating and controlling various mechanisms of a calculating machine, and particularly for controlling different power-operated mechanisms of the type of calculating machine described and shown in the aforementioned Avery patent.

It is a further object of the invention to provide a clearing mechanism for the registering devices operated by power derived from the cyclically operated driving member or hand-crank of the machine, and to provide means whereby power for operating such clearing mechanisms may be stored from such cyclic operating member and released after the same has come to rest.

Various further objects and advantages of the calculating machine of the present invention will appear from the following description of the preferred form of machine embodying the present invention, for which purpose reference is made to the accompanying drawings, in which—

Figure 1 is a top exterior view of the machine, showing the location of the various control members.

Figure 2 is a detailed section, as viewed from the right, showing the members which constitute the centralizing and interlocking means for the selective speed transmission unit.

Figure 3 is a longitudinal section, as viewed from the right, showing the general arrangement of the parts of the machine.

Figure 4 is a longitudinal section, as viewed from the right, showing part of the selection and actuation mechanism.

Figure 5 is a lateral section taken on the line V—V of Figure 4.

Figures 6 to 9, inclusive, are detail views of the selection control devices shown in Figures 4 and 5.

Figure 10 is a developed plan view, partly schematic and partly in section, of the selective speed transmission unit, its drive to the actuator and related mechanisms.

Figure 11 is a front view of the members which control the selective transmission unit.

Figure 12 is a sectional view taken on the line XII—XII of Figure 13.

Figure 13 is a right side view of the linkage between the control members, shown in Figure 11, and the selective transmission shaft.

Figure 14 is a right side view of the mechanism for releasing and for locking the actuator drive gears.

Figure 15 is a right side view of the actuator centralizer and the means for locking the actuator in full cycle position, and the interlocking means between the actuator and the carriage dipping mechanism.

Figure 16 is a right side view of the mechanism for locking the selection levers in position while actuation is taking place.

Figure 17 is a section through the carriage, as viewed from the right, showing the mechanism for tapping the bell to indicate an overdraft.

Figure 17A is a detailed view of means for returning a particular shaft to its normal position.

Figure 18:
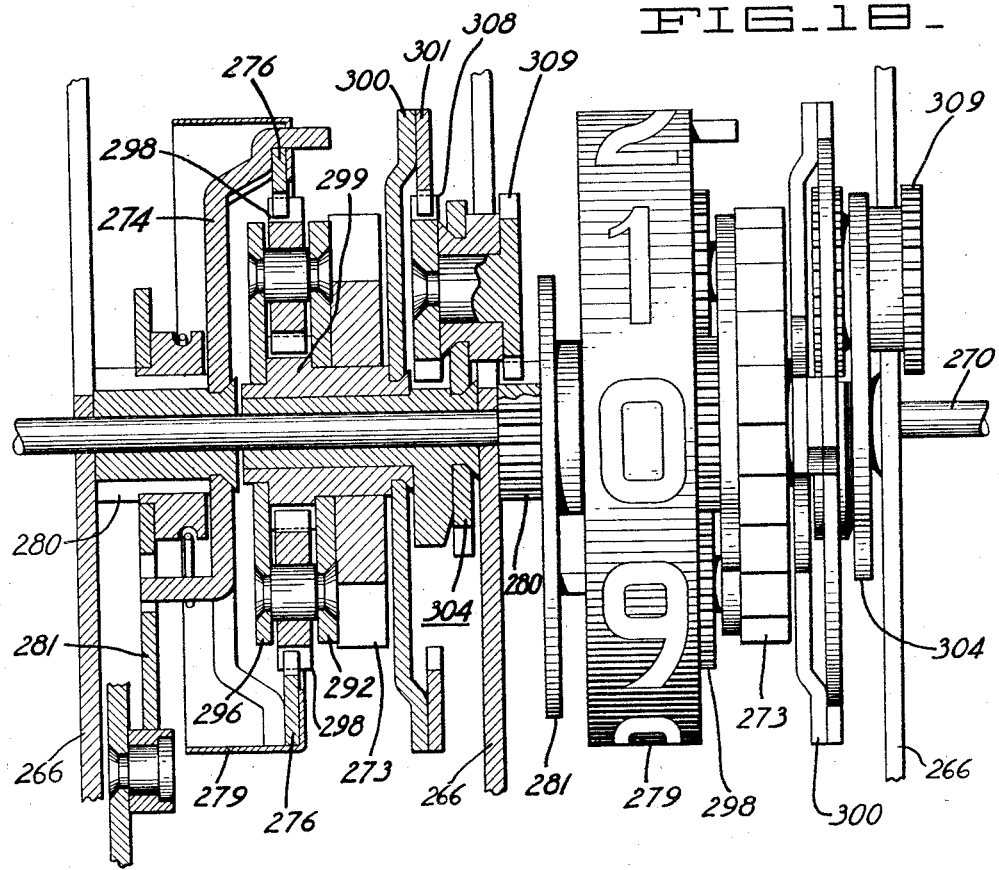

Figure 18 is an enlarged view, partly in section, of two orders of the accumulator, showing the construction thereof.

Figure 19:
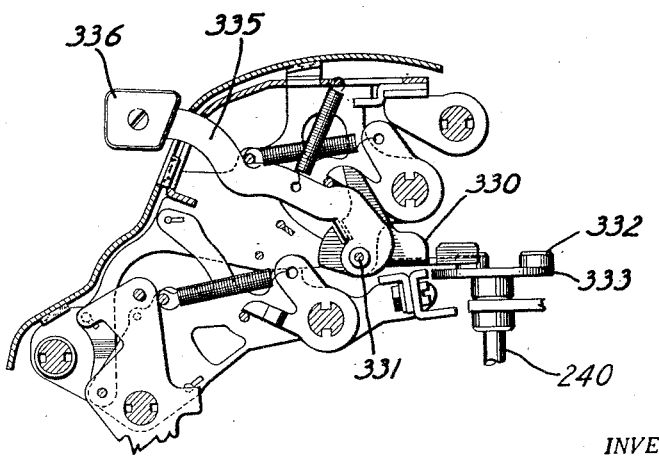

Figure 19 is a section through the carriage, as viewed from the right, showing the lever and related mechanism by which the carriage may be freely traversed in either direction.

Figures 20 and 23 are sections taken through the carriage to illustrate the construction of the accumulators, the section being taken so as to bring out the inter-action and relationship between certain of the parts.

Figure 21 is a top view of the shift centralizer.

Figure 22 is a top view of the driving means between the shift mechanism and the traversable carriage.

Figure 24 is a section taken on the line XXIV—XXIV of Figure 26.

Figure 25 is a front view of the mechanism shown in Figure 24.

Figure 26 is a right side view of the manual and automatic means for controlling and actuating the shifting mechanism.

Figure 27 is a right side view of the mechanism for actuating the counter register and the means for reversing the same.

Figure 28 is a section of the counter reverse unit, as viewed from the rear, showing the means for reversing the action of the counter finger.

Figure 29 is a detail view of the cams and related mechanism which condition the clearing mechanism.

Figure 30 is a right side view of the clearing mechanism and the connections therefrom to the shafts which effect clearance of the registers.

MODIFIED EMBODIMENT

Figure 31 is a section, as viewed from the right, showing an alternative arrangement for retaining the carriage drive gears in mesh with the actuator for a plurality of actuating cycles.

Figure 32 is a section, as viewed from the right, showing an alternative arrangement for rocking the ordinal cam follows clear of the dial cams during plus actuation.

Figure 33 is an enlarged sectional view, taken on the line XXXIII—XXXIII of Figure 31.

Certain of the primary units of the machine embodying the present invention are either taken wholly or slightly altered from the showing in the aforementioned Avery patent. These units will, therefore, be only generally described.

KEY SETTING AND ACTUATING MECHANISM

The numeral keys 15 (Figure 1), by means of which the factors are entered into the machine, are arranged in parallel banks of ten keys each, one such bank being shown in Figure 4. Each key 15 is mounted on a key stem 16, which is vertically slidable in the slots 7 and 8 in the key bank frame 9. The key stems are normally maintained in raised position by springs 6 compressed between a boss 4 on frame 9 and an opposite lug 5 on the key stem, the body of the key stem being cut away, as shown at 3 in Figure 5, to receive the spring and to provide a cross-bar. Spring clips 30 embrace the key stems 16 adjacent the under-side of the top of frame member 9 and constitute a cushioning stop for arresting the rise of the keys under the influence of springs 6.

Each key bank frame 9 is mounted in the machine on cross-bars 72 and 73, which extend between side frame members, not shown, and a screw 76 extending through the bar 72 into contact with each frame 9 may be adjusted so as to correctly position the key frame, which may then be fixed by means of screw 77 extending through a slot in frame 9 into bar 73.

Means are provided for latching depressed value keys in depressed position. Rollers 87 and 88 journaled in members 89 and 90, depending from frame 9, support a plurality of longitudinally slidable bars, including a lock bar 40 (Figures 4 and 5), provided with cam faces 91 underlying each of the key stem cross bars whereby depression of any key will move the bar 40 to the left, as viewed in Figure 4. Underlying all of the key stems, except that of the zero key, situated at the left of Figure 4, the bar 40 is also provided with latching hooks 92 so that as the cross-bar of the key stem passes below the hook 92 the bar 40 may return to the right, as viewed in Figure 4, to latch the key in depressed position. Spring 93 serves to return the lock bar 40 to the right in such operations.

Means are provided for indicating upon aligned numeral wheels the amount to which the selecting mechanism is set by depression of the keyboard keys. Also, supported upon the rollers 87 and 88 is a longitudinally slidable check dial bar 50 provided with nine evenly spaced notches 59, each having a bottom portion designed to receive the cross-bar of the overlying key stem 16 and divergent sides designed to be engaged by the lower end of said key stem, so that the bar will be moved longitudinally as the key is depressed. The spacing of the notches 59 is slightly less than the spacing of the key stems 16, so that upon depression of any value key the bar 50 will be cammed to the right (as viewed in Figure 4), a distance proportional to the value of the key depressed. The bar 50 does not extend under the zero key, however, and is not affected by depression thereof.

The check dial bar 50 is thus given differential movement proportional to the value of the key depressed and this differential movement is transmitted to the check dial 52, rotatably mounted with other similar check dials on a shaft 53, extending across all decimal orders of the keyboard, so that numerals on the periphery of the dials 52 will be exposed through the sight openings 68.

Each check dial 52 has fixed thereto a pinion 56 operating in engagement with a segment 57 formed on one end of a lever 58 pivoted in the frame of the machine at 67 and provided with a pin 61, which is engaged by a notch in the check dial bar 50. A spring 93a, tensioned between an ear 95 on the lever 58, and a stud 96 on the machine frame urge the lever 58 clockwise about its pivot and thus normally maintain the parts in the position in which they are shown in Figure 4, in which a stop member 97 fixed to each dial 52 bears against one of the teeth of a comb 98 fixed in the machine frame to limit counter-clockwise rotation of the dial 52 to the point at which the zero numeral thereon is exposed through the sight opening 68. Depression of any value key will, therefore, by imparting a differential movement proportional to the value of the key to bar 50 and lever 58, rotate dial 52 clockwise to expose through the sight opening 68 a digit indicating the value of the depressed key.

As described in the Avery patent, above referred to, the selection mechanism of the aforesaid type of Marchant machine comprises three shafts 166, 167, and 168, hereinafter referred to as the half, quarter, and twelfth speed shafts, respectively, and common to all decimal orders of the machine. These shafts are connected to a selective ratio transmission described in said Avery patent, so that shaft 166 rotates through 180° for each cycle of operation of the machine, while shaft 168 rotates through 30° for each such cycle of operation. In each decimal order a sleeve 179 is rotatably mounted on a shaft 170 disposed adjacent the aforesaid actuating shafts, and each sleeve 179 has keyed thereto a plurality of gears through which the several orders of the registering mechanism are driven.

Means are provided for connecting each sleeve 179 to the actuator gear trains so that it can be either locked or driven by one of the three shafts 166, 167, or 168 at any of nine different rates with respect to the driving means, said rates corresponding to the values delineated upon the keys 15. Since this mechanism is repeated in each decimal order of the machine, only one such order need be described in detail.

As shown in Figure 4, a gear 471 is keyed to sleeve 179 and there is mounted to oscillate freely on a spacer mounted on said sleeve alongside gear 471, a selection plate 472 having rotatably mounted thereon an idler gear 473 and an idler gear 474 entrained with gear 471. Keyed to the half speed shaft 166 and in radial alignment with gear 473 is a twelve-tooth gear 475, while in radial alignment with gear 473 on its opposite side is a twenty-tooth gear 476 keyed to the quarter speed shaft 167. Thus, if plate 472 is swung to the right (as viewed in Figure 4) gear 473 will be brought into mesh with gear 476, whereupon the 90° rotation of shaft 167 during each cycle of operation of the machine will advance the gear 471 five teeth; while if plate 472 is swung to the left, gear 473 will be carried into mesh with gear 475 and the 180° rotation of shaft 166 will advance the gear 471 six teeth during each cycle of operation of the machine. By this means, either a five or a six selection may be effected.

Also, keyed to the sleeve 179 is gear 477 (Figure 7) and mounted for oscillation on a spacer carried by said sleeve alongside of this gear, is a selection plate 478 on which are mounted idler gears 479 and 480, which are entrained with gear 477. Keyed to shaft 166 in radial alignment with idler 479 is a fourteen-tooth gear 481, and keyed to shaft 167 in radial alignment with idler 479 is a sixteen-tooth gear 582. Thus, when the selection plate 478 is swung to the right (as viewed in Figure 7), its idler 479 will mesh with the gear 482 and the 90° rotation of shaft 167 in each cycle will serve to advance the gear 477 four teeth; while, when the said plate 478 is swung toward the left, idler 479 will mesh with gear 481 and the 180° rotation of shaft 166 in each cycle will serve to advance the gear 477 seven teeth. By this means, either a seven or a four selection may be effected.

Also, keyed upon sleeve 179 (Figure 6) is a gear 483, and mounted to oscillate freely upon a spacer carried by the sleeve 179 alongside this gear is a selection plate 484, similar to those above described, and carrying idlers 485 and 486. Keyed to shaft 166 in radial alignment with idler 485 is a sixteen-tooth gear 487, and keyed to shaft 167 in radial alignment with idler 486 is a twelve-tooth gear 488. Thus, when plate 484 is swung to the left (as viewed in Figure 6) its idler 485 will mesh with gear 487 and the 180° rotation of shaft 166 in each cycle will serve to advance the gear 483 eight teeth; while when plate 484 is swung toward the right, idler 485 will mesh with gear 488 and the 90° rotation of shaft 167 in each cycle of operation will serve to advance the gear 483 three teeth. By this means, either an eight or a three selection may be effected.

Also, keyed to the sleeve 179 is a broad faced gear 189 (Figure 9), and freely mounted for oscillation on a spacer carried by the sleeve 179 on one side of this gear is a selection plate 490, similar to those above described, and mounting idlers 290 and 291. Keyed to shaft 166 in radial alignment with idler 291 is an eighteen-tooth gear 493, and keyed to shaft 168 and meshing with a gear 494 rotatably mounted upon shaft 167 in radial alignment with idler 291 is a twenty-four-tooth gear 495. Thus, if plate 490 is swung to the left (as viewed in Figure 9), idler 291 will mesh with gear 493 and the 180° rotation of the shaft 166 in each cycle will serve to advance the gear 189 nine teeth; while, if the plate 490 is swung toward the right, the idler 291 will mesh with the gear 494 and the 30° rotation of shaft 168 in each cycle will drive gear 494 through gear 495 to advance the gear 189 two teeth. By this means, either a nine or a two selection may be effected.

Mounted for oscillation on sleeve 179 at the opposite side of gear 189 is another selection plate 496 (Figure 8) having mounted thereon intermeshing idler gears 497 and 498. Gear 498 is constantly enmeshed with gear 189, while gear 497 may mesh with the twenty-four-tooth idler gear 499 rotatably mounted on shaft 167 when the plate 496 is swung to the right (as viewed in Figure 8). This gear 499 is driven by a twelve-tooth gear 200 keyed on shaft 168 so that gear 189 will be advanced a single tooth upon a 30° rotation of gear 200 when plate 496 is swung to the right.

A zero selection is effected by holding gear 189 against rotation. For this purpose, a pawl 201 (Figures 4 and 8) is mounted upon a shaft 202, so that when the plate 496 is swung to the left (as viewed in Figure 8) the edge of said plate will engage an ear 203 on pawl 201 and retain said pawl in engagement with the gear 189 after the shaft 202 is rocked, as hereinafter described.

The shaft 202 extends across all orders of the machine and one pawl 201 is provided for each decimal order. At the commencement of operation, shaft 202 is rocked counter-clockwise to a limited extent by a mechanism to be presently described, and when the machine comes to rest the shaft is returned in a clockwise direction. It will be noted that pawl 201 is provided with narrow keys 204 lying in wider key-ways in the shaft 202, and, therefore, when some value other than zero is selected in a given order the initial counter-clockwise rocking of shaft 202 will free pawl 201 so that upon rotation of sleeve 179 the gear 189 may rock its associated pawl 201 out of the way. However, if a zero is selected in a particular order, the associated plate engaging the lug 203 of the pawl 201, as previously explained, will retain the pawl in engagement with the gear 189, notwithstanding the counter-clockwise movement of the shaft 202, because the key-way in which the keys 204 are engaged is wide enough to permit such limited rocking movement of the shaft 202 as is necessary in this operation. By this arrangement, when the selection plate 496 is swung toward the left, as viewed in Figure 8, the gear 189 is locked and the zero selection is effected.

It will be apparent from the foregoing that one of the five selection plates in each order is positioned during a selection operation to select either a numeral value or zero, while the remaining four plates of that order are held in idle position. The value positions are positions in which the plate-carried gears mesh with gears on shafts 166 or 167, while the idle position is the intermediate position of the plates in which no such connection is effected. Thus, if a six is to be selected, by way of example, plate 472 (Figure 4) will be swung to the left to engage gear 475, while all the other plates will be held in intermediate positions.

The selection plates are set to the several value-selecting and intermediate idle positions, above described, by a series of longitudinally adjustable selection bars supported upon rollers 87 and 88 (Figure 4) alongside the previously described locking bar 40 and check dial bar 50 of each key bank.

For the purpose of effecting a zero or one selection, the plate 496 (Figure 8) is connected to a selection bar 410 (Figures 5 and 8) supported on the rollers 87 and 88 and having an extended arm 411 provided with a slot 412 engaging a pin 413 on selection plate 496, so that upon longitudinal movement of the bar 410 the plate 496 will be moved either into its zero, intermediate, or one selection position. Spring 93, tensioned between an ear 94 of the previously described locking bar 40 and an ear 99 of the selection bar 410 urges the bar 410 toward the left (as viewed in Figure 8), normally maintaining stop lug 414 against roller 87 and selection plate 496 in its zero selection position, in which it maintains pawl 201 in locked engagement with gear 189. The upper edge of bar 410 is, however, provided with notches 416 having divergent sides underlying the cross-bars of each of the key stems 16 of the two to nine value keys, inclusive, the bottoms of said notches 416 being sufficiently offset from the lower ends of the key stems to cause the latter to cam bar 410 to the right a sufficient distance to move the plate 496 into its intermediate position when one of these keys is depressed.

A similar notch 417 underlies the cross-bar of the key stem 16 associated with the one value key, but the bottom of said notch is offset from the bottom of said key stem a sufficient distance to cause the depression of said key to cam the bar 410 to the right a sufficient distance to carry the gear 497 mounted on plate 496 into mesh with gear 499 and thus effect a one selection as above described. For the purpose of effecting positive restoration of the plate 496 into its zero selection position upon depression of a zero key, a notch 418 underlies the cross-bar of the stem 16 of the zero key of each key bank and is provided with one divergent edge adapted to cause the bar 410 to be cammed to the left a sufficient distance to positively move the plate into its zero selection position upon depression of the zero key.

The positioning of the selection plate 490, by means of which either a nine or a two selection may be effected, as above described, is controlled by selection bar 420 (Figures 5 and 9) having an arm extension 421 provided with a slot 422 engaging a pin 423 on a selection plate 490, so that upon longitudinal movement of the bar 420 the plate 490 may be moved into its nine selection, intermediate, or two selection positions.

When neither the nine nor the two key is depressed, the bar 420 and its connected plate 490 are maintained in their intermediate position by extensions 424 and 425 of the bar 420 which abut opposite sides of the nine key and the two key, respectively, to prevent longitudinal movement of the bar 420 so long as both of these keys are in raised position.

Underlying the nine key, the bar 420 is provided with a notch 426 having an angular edge 427 adapted to be engaged by the cross-bar of the stem 16 of the nine key, upon depression thereof, to cam the bar 420 to the left (as viewed in Figure 9) and move the plate 490 to carry its gear 291 into mesh with the gear 493 for the purpose of effecting a nine selection as above described. Upon release of the nine key from depressed position, the upper edge of its cross-bar is adapted to be brought into contact with the cam surface on the extension 424 to return the plate 490 to intermediate position.

Underlying the two key, the bar 420 is provided with a notch 428 having an angular side 429 adapted to be engaged by the stem 16 of the two key upon depression thereof to cam the bar 420 to the right (as viewed in Figure 9), moving plate 490 to bring its gear 291 into mesh with the gear 494 to effect a two selection as above described. Upon release of the two key from depressed position, the upper edge of its cross-bar is adapted to contact a cam surface on the underside of the extension 425 to move the bar 420 and its attached plate 490 to intermediate position.

The positioning of the selection plate 484 (Figure 6) to effect an eight or three selection, as hereinabove described, is controlled by a selection bar 430 (Figures 5 and 6) having an extension arm 431 provided with a slot 432 engaging a pin 433 on the plate 484, so that upon longitudinal movement of the bar 430 on rollers 87 and 88 the plate 484 may be moved into its eight selection, intermediate, or three selection positions. The bar 430 and selection plate 484 are normally maintained in their intermediate positions by means comprising extensions 434 and 435 of plate 430 which abut opposite sides of the stems of the eight and three keys, respectively, so that no substantial longitudinal movement of the bar 430 is possible unless one of these keys is depressed.

Underlying the stem 16 of the eight key is a notch 436 having a divergent edge 437 adapted to be contacted by the stem of the eight key upon depression thereof to cam the bar 430 to the left (as viewed in Figure 6) and carry the gear 485 mounted on selection plate 484 into mesh with the gear 487 to effect an eight selection, as hereinabove described. Upon release of the eight key from depressed position the upper edge of its cross-bar is adapted to contact a cam surface on the underside of extension 434 to return the bar 430 and selection plate 484 to intermediate position as the key rises.

Underlying the stem of the three key is a notch 438 provided with a divergent edge 439 adapted to be contacted by the stem of the three key upon depression thereof to cam the bar 430 to the right (as viewed in Figure 6) and carry gear 485 on plate 484 into mesh with gear 488 to effect a three selection, as above described. Upon release of the three key from depressed position, the upper side of its cross-bar is adapted to contact a cam surface on the underside of extension 435 and return the bar 430 and plate 484 to intermediate position as the key rises.

The positioning of the selection plate 478 (Figure 7) to effect a seven or a four selection, as hereinabove described, is controlled by a bar 440 having an extension arm 441 provided with a slot 442 engaging a pin 443 on the plate 478, so that upon longitudinal movement of the bar 440 on rollers 87 and 88 the plate 478 may be moved into its seven selection, intermediate, or four selection positions. The bar 440 and its connected plate 478 are normally maintained in intermediate position by means comprising extensions 444 and 445 of bar 440 which abut opposite sides of the stems 16 of the seven and the four keys, respectively, so as to prevent any substantial longitudinal movement of the bar 440 so long as both of these keys are in raised position.

Underlying the stem 16 of the seven key is a notch 446 having a divergent edge 447 adapted to be contacted by the stem of the seven key upon depression thereof to cam the bar 440 to the left (as viewed in Figure 7) and carry the gear 479 mounted on plate 478 into mesh with the gear 481 to effect a seven selection as hereinabove described. Upon release of the seven key from depressed position, the upper edge of its cross-bar is adapted to contact a cam surface on the underside of extension 444 and move the bar 440 and its connected plate 478 to intermediate position as the key rises.

Underlying the stem 16 of the four key is a notch 448 provided with a divergent edge 449 adapted to be contacted by the stem of the key upon depression thereof to cam the bar 440 to the right (Figure 7) and carry gear 479 into mesh with gear 482 to effect a four selection, as hereinabove described. Upon release of the four key from depressed position, the upper edge of its cross-bar is adapted to contact a cam surface on the underside of extension 445 to move the bar 440 and its connected plate 478 to intermediate position as the key rises.

The positioning of the plate 472 (Figure 4) to effect a five or a six selection, as hereinabove described, is controlled by a selection bar 450 having an extension arm 161 provided with a slot 162 engaging a pin 163 on plate 472 so that upon longitudinal movement of bar 450 on rollers 87 and 88 the plate 472 will be moved into its five selection, intermediate, or six selection positions. Bar 450 and its connected plate 472 are normally maintained in intermediate position by means comprising extensions 164 and 165 of bar 450 abutting opposite sides of the stems of the six and five keys, respectively, to prevent any substantial longitudinal movement of the bar 450 so long as both of these keys are in raised position.

Underlying the stem 16 of the six key is a notch 451 having a divergent edge 167 adapted to be contacted by a stem of the key on depression thereof to cam the bar 450 to the left (as viewed in Figure 4) and move the gear 473 on plate 472 into mesh with the gear 475 to effect a six selection, as hereinabove described. Upon release of the six key from depressed position, the upper edge of its cross-bar is adapted to contact a cam surface on the under-side of extension 164 to move the bar 450 and its connected plate 472 to intermediate position as the key rises.

Underlying the stem 16 of the five key is a notch 452 having a divergent edge 169 adapted to be contacted by the stem of the key upon depression thereof, to cam the bar 450 to the right (as viewed in Figure 4), and carry the gear 473 on plate 472 into mesh with the gear 476 to effect a five selection, as hereinabove described. Upon release of the key from depressed position the upper edge of its cross-bar is adapted to contact a cam surface on the underside of extension 165 to move the bar 450 and its connected plate 472 to intermediate position as the key rises.

Depression of any value key in a given bank serves to release any previously depressed key in the same bank, and if the previously depressed key is associated with a different selection bar to positively return such selection bar and the plate associated therewith to intermediate position. If the previously depressed key is associated with the same selection bar, the said bar will be reset through its intermediate position to a new selection position.

For this purpose, each of the selection bars 420, 430, 440, and 450 (Figures 4, 6, 7, and 9) is provided with a plurality of notches 455, which when the said selection bars are in their intermediate position underlie the stems of the value keys other than those adapted to move the respective selection bars into active position. Each of the notches 455 is provided with divergent edges 454 adapted to be contacted by the cross-bar of a depending key stem 16, so that the latter will cam the bar longitudinally in either direction to intermediate or idle position, as the key is depressed. If a given selection bar is in its intermediate or idle position as a key is depressed, the key stem 16 will enter directly into the notch 455 and latch the selection bar against endwise movement in either direction.

Thus, it will be seen on reference, for instance, to Figure 9 that if the nine key stands depressed a subsequent depression of the one key will not only release the nine key and permit its stem to rise under the influence of its spring 6, but the descending stem of the one key will come into contact with the cam surface 454 and positively cam the selection bar 420 to the right (as viewed in Figure 9) until it reaches its intermediate or idle position when the stem of the one key will enter the notch 455 and latch the selection bar 420 in its intermediate or idle position.

Means are provided to lock the plurality of selection plates 472, 484, 478, 496 and 490 (Figures 16, 4, 6, 7, 8, and 9) in one of their three positions during the actuation period. A shaft 115 (Figure 16) is rocked counter-clockwise just before the actuation period by mechanisms explained hereinafter. A lever 183 is secured to this shaft and is connected to a lever 184 pivoted on a shaft 188. A selection locking bail 185 is secured to lever 184 and extends across the machine so that a flange 186 thereon may be moved upwardly into one of the three notches 187 to lock all the selection plates in one of the three positions described hereinbefore. After the actuation cycles are completed, the shaft 115 is rocked back to the position shown, which rocking moves the flange 186 out of the notches 187 so the plates may be moved to a new setting indicative of the next selection entered on the keys 15 (Figure 1).

ACCUMULATOR

The actuation of the numeral wheels 279 is effected by mechanism including the above-mentioned pivot gears 189 (Figure 3) which mesh with the gears 271 mounted in the shiftable carriage. Gears 273 mesh with the gears 271 and are integral with two plates 292 and 296 (Figure 18) between which are journaled the planetary gears 298. These planetary gears revolve about a sun gear 299 and drive the ring gear 276 and its integral numeral wheel 279 in a manner more completely described in the Avery Patent Number 2,222,164, dated November 19, 1940, to which reference may be had for a full description of portions of the accumulator mechanism not specifically disclosed herein.

In addition to this direct actuation of the numeral wheels by the actuator unit a tens transfer mechanism is provided whereby one complete revolution of a numeral wheel will effect one-tenth of a revolution of the next higher numeral wheel. This is accomplished through a direct 10 to 1 planetary gear train from one numeral wheel to the one immediately to the left thereof, which train consists of gear 280 (Figure 18) integral with the numeral wheel 279, planetary gears 309 and 308, ring gear 301 and its carrier 300 which are integral with sun gear 299, and planetary gears 298 which drive the ring gear 276 integral with the next higher numeral wheel.

Obviously, if the numeral wheel to the right in Figure 18, for example, is driven one-half a revolution or five digital increments, the numeral wheel to the left will be driven one-half of one-tenth of a revolution, or half the distance between numerals. After the actuation is completed, it is necessary to back up the left-hand dial by the amount of this partial increment so the numeral can be read through the opening in the carriage cover. For this purpose, a numeral wheel aligning cam 281 (Figures 3 and 18) is made integral with the numeral wheel and is so shaped as to permit the cam follower 315 to be rocked upwardly from the position shown in Figures 3 and 17, by an amount proportional to the digit displayed on the numeral wheel. An ear 314 (Figures 3 and 23) of a rocking segment 313 underlies the cam follower 315 so as to limit the clockwise movement of said rocking segment in accordance with the current position of the cam follower 315, thereby rocking the plate 304 which carries planetary gears 308 and 309. Therefore, these planetary gears are backed up by movement of the segment 304 through an angle which cancels the amount they are driven forward by the gear 280, and, as explained more in detail in the last mentioned Avery patent, the next higher dial is likewise backed up by the same partial increment it receives through the 10 to 1 tens transfer train.

As explained hereinafter, the dipping bail 269 is lowered prior to the actuating cycle to move the gears 271 into mesh with the actuator gears 189. During this period, the above aligning mechanism is unnecessary and thus disabled, but at the completion of the actuation period the gears 271 are moved upwardly out of mesh with the actuator and the aligning mechanism is rendered effective to enable the operator to read the correct registration on the numeral wheel.

DRIVING MECHANISM

The operating cycle of the present machine is divided into three phases: a setting phase, an actuating phase, and a restore and shift phase of approximately twelve and one-half per cent, seventy-five per cent, and twelve and one-half per cent of the cycle, respectively.

Means are provided to enmesh the carriage drive gear 271 (Figure 3) with the actuator pivot gear 189 during the setting phase, and to accomplish this a direct drive is established from the crank handle 100 (Figures 3 and 10) to a dipping cam 108. Crank 100 is made integral with gear 103 and shaft 102. Gears 103, 104, 105, and 106 are constantly in mesh, and since gears 103 and 106 have the same number of teeth, one turn of the crank 100 effects one complete rotation of gear 106 and of shaft 107 and cam 108 integral therewith.

On a stud 109 (Figure 3) is freely pivoted a bell crank 110, provided with a roller 111 which lies in the plane of cam 108. A second roller 113 is provided on said bell crank which cooperates with a downwardly extending arm 114 to effect a rocking of shaft 115 to which arm 114 is secured. Also, integrally secured to shaft 115 are two dipping arms 116 on each of which are mounted two rollers 117 adapted to embrace the dipping bail 269. As described in the aforementioned Avery Patent No. 2,271,240, this bail 269 is disposed laterally in the machine and is secured to the rear end of each of the carriage brace plates 266, so that when the bail 269 is lowered the plates 266 are all rocked downwardly about their common supporting shaft 262, thereby moving all gears 271 into mesh with the actuator pivot gears 189. The cam 108 is so designed that it completes its rise in the first 45° of its rotation in either direction from the position shown in Figure 3; so the carriage will be dipped and ready for actuation when the hand-crank cycle is twelve and one-half per cent complete.

SELECTIVE RATIO TRANSMISSION

The drive from the hand-crank to the actuator runs through a selective ratio transmission unit, which consists of a series of gears 121 to 129, inclusive (Figure 10), freely mounted on shaft 120, and a second series of cooperating gears 131 to 139, inclusive, securely mounted on shaft 130. The gears 103 and 104 have the same number of teeth, and gear 104 is secured to shaft 120 so that this shaft will always rotate an angular amount equal to that of the crank.

Each of the gears 121 and 129 has welded thereto or otherwise made integral therewith a centralizer and interlocking disc 141 (Figures 10 and 2). Keyways 142 are provided in the gears 121 to 129 and the discs 141. These keyways are somewhat wider than the thickness of a key 140 to facilitate shifting of the key from one gear to another. As shown in Figure 10, the shaft 120 has a deep keyway cut in one side to receive the slidable key 140. It will be noted that the key terminates at its rightward end in a driving tongue the length of which is slightly shorter than the combined thickness of a gear 121 to 129 and its respective disc 141. From the foregoing, it may be seen that by sliding the key 140 along the shaft 120 one may establish a positive drive from the shaft 120 to a selected gear 121 to 129, which in turn will drive its respective gear 131 to 139 integral with shaft 130.

In Figure 3 the gear 121 is shown and it will be noted that it has several teeth removed. The removal of these teeth serves two purposes: (1) in case shaft 130 is driven through some other pair of gears it provides clearance in which gear 131 may turn; and (2) if this pair of gears serves as the driving means it allows for the twelve and one-half per cent idle period termed the setting phase during which the register gears 271 are moved into mesh with the actuator gear 189 before the drive begins.

Obviously, a great many arrangements could be devised to give a desired operation. For example, one may desire to have the gears all of the same diametral pitch, but this would make it necessary to vary the idle period of each set of gears. The combination, however, which seems most desirable is to maintain a constant idle period and vary the pitch. The following tabulation is one alternative where the idle period is constant and the diametral pitches vary accordingly.

Table A

|  | Selection | | | | | | | | |
|---|---|---|---|---|---|---|---|---|---|
|  | 1 | 2 | 3 | 4 | 5 | 6 | 7 | 8 | 9 |
| Diametral pitch | 26 | 25.5 | 28 | 25 | 29 | 27.5 | 37 | 41 | 30 |
| Gears | #131 | #132 | #133 | #134 | #135 | #136 | #137 | #138 | #139 |
| Number of teeth | 36 | 27 | 24 | 18 | 18 | 15 | 18 | 18 | 12 |
| Gear | #121 | #122 | #123 | #124 | #125 | #126 | #127 | #128 | #129 |
| Number of teeth effectively driven | 12 | 18 | 24 | 24 | 30 | 30 | 42 | 48 | 36 |
| Teeth of complete gear | 16 | 24 | 32 | 32 | 40 | 40 | 56 | 64 | 48 |
| Idle period___per cent | 25 | 25 | 25 | 25 | 25 | 25 | 25 | 25 | 25 |

It will be noted in the first column of the table that gear 121 is a sixteen-tooth gear with the number of teeth it will effectively drive as twelve, which is exactly seventy-five per cent of sixteen; while in Figure 3 gear 121 is shown with only ten teeth. This is because the first tooth of gear 121 would contact one tooth before the one on the center line, and upon completion of the actuation the last tooth of gear 121 would wipe its respective tooth one space past center. This would cause an effective drive of two teeth more than the actual number of driving teeth; therefore, in this case, the number of teeth remaining is two less than the desired number of teeth to be effectively driven.

If the key 140 were inadvertently positioned between two gears so as to drive them both, it would, of course, jam the transmission with both gears considerably displaced from their neutral positions. To prevent this, means are provided whereby the key 140 can never drive two gears 121 to 129 out of their neutral positions at the same time. The disc 141 (Figure 2) is provided with a recess into which is pressed the nose of pawl 143 by the tension of spring 144, which tends to maintain the pawl 143 in its extreme clockwise position shown. Underlying a shoulder 145 of the pawls 143 are a series of balls 146 (Figure 10) which are held in a retainer 147. The length of this retainer is equal to the combined diameters of all the balls plus the thickness of one pawl 143. The balls are free to roll a limited amount sufficient to allow one pawl at a time to enter between a pair of balls. In viewing Figure 2, it will be seen that when the key 140 is positioned in the order shown, for example, the gear and disc 141 may be rotated and immediately thereupon the pawl 143 is rocked counter-clockwise about shaft 149 and passes between two of the balls as shown by the dotted lines 148 (Figure 10). If the key 140 is midway between two positions, however, an attempt will be made to drive two gears, but this will be impossible because two pawls can not enter the retainer at the same time; the result being the neither can be rocked counter-clockwise far enough to permit the disc and gear to turn appreciably until the key is correctly aligned.

With the transmission thus controlled, the gear selected may rotate but all others will be held in their neutral positions. Since the shaft 130 (Figure 10) and all gears 131 to 139 rotate as a unit, the gear 131 is used as a convenient means to drive the actuator through the idler 150, mounted on stud 151, and gear 152 secured to the half-speed shaft 166 of the actuator. The quarter-speed and twelfth-speed actuator shafts 167 and 168 are also shown in Figure 10, which together with shaft 166 serve to drive the register through the actuator gearing, explained hereinbefore and in the last mentioned Avery patent. Thus, a positive selective drive may be established between the crank and the actuator in such a way that one turn of the crank will effect from one to nine half revolutions of the half-speed shaft 166 to effect the operation of the actuator through cycles of operation depending on which gear 121 to 129 is selected to drive.

Means are provided to centralize the actuator so that gears 131 to 139 will always come to rest in a centralized position and to lock the actuator against rotation when the gears 271 (Figure 3) are not lowered into mesh with the actuator gears 189, and further to lock the gears 271 in their lowered position while the actuator is out of a centralized position. On the left end of the half-speed actuator shaft 166 (Figure 15) is secured an actuator centralizing disc 153 with two oppositely disposed recesses 154 into which are urged two rollers 155 mounted on levers 156 and 157. These levers are pivotally mounted on stud 158 and constantly urged toward the disc 153 by the spring 159 tensioned between the two levers. In this manner, the pressure of the rollers 155 against the recesses 154 will always hold the actuator in a centralized position, unless positively driven.

The lever 157 is provided with a slightly curved surface 160 in the form of an arc of a circle drawn around shaft 115 as a center, and on said shaft is secured an arm 171, on opposite sides of which are mounted two rollers 172 and 178 (Figure 14). Of these, roller 178 is adapted to sweep across the arcuate surface 160 and prevent clockwise movement of lever 157. The parts in Figure 15 are shown in the position they assume when the gears 271 (Figure 14) and related parts, frequently called "the lower carriage," are in a raised position. When, however, the lower carriage is dipped, as previously described, the levers 116 and 171 rock counter-clockwise with shaft 115 until the roller 178 (Figures 14 and 15) assumes the position 178a. In this position lever 157 is free to be forced rearwardly by disc 153 when the actuator turns.

When the lever 157 is forced rearwardly in this manner the shoulder 157a lies in the return path of roller 178 and thus locks the lever 171 and the lower carriage against return movement until the actuator approaches a centralized position, when the rollers 155 again become seated in the recesses of disc 153.

Means are provided to lock the gears 189 (Figure 14) in correct alignment after the actuating phase is completed so the carriage may be subsequently lowered into mesh with the actuator without the gears 189 and 271 clashing. The second roller 172 on lever 171 sweeps across the arcuate surface 174 of lever 175 (Figure 14) to lock said lever against clockwise movement about stud 158 in the same manner that roller 178 locked the lever 157. A lever 586 is keyed to shaft 202 and is provided with a bifurcated lower end which embraces stud 176 of lever 175. Also, on shaft 202 are loosely keyed a series of ordinal pawls 201 which engage between the teeth of each pivot gear 189. On viewing Figure 14, it will be seen that pawl 201 is forced against gear 189 so that when the lower carriage is dipped for actuation the teeth of gear 189 will be in a position to receive the gear 271. When the roller 172 is moved downwardly, lever 175 is free to be rocked clockwise by spring 177 to rock lever 586 and shaft 202 counter-clockwise, so that if a selection is made in the order shown in Figure 14 the gear 189 may turn on shaft 170 and force the pawl 201 clear of the teeth. The way in which ear 203 serves to hold the pawls 201 in all unset orders, so the unactuated gears 189 can not float out of alignment, was explained briefly hereinbefore and may be found in more detail in the aforesaid Avery Patent 2,271,240.

MULTIPLIER SETTING

Manually operable means are provided to shift the key 140 (Figure 10) into alignment with one of the gears 121 to 129 whereby the machine may be selectively set to drive the actuator a selected number of cycles during each turn of the crank. This means includes a slidable member 20 (Figure 11) having a thumb-piece 21, by means of which the multiplier selection mechanism may be operated by the thumb of the left-hand. A pointer 22 is provided on the member 20 to indicate to the operator what selection is made. Three rollers 23 (each of which is split and shouldered as indicated in Figure 13) are secured to plate 20 and are adapted to roll in slots 24 of the front frame plate of the machine. The numerals zero to nine are delineated on the front cover so the operator may slide the thumb-piece in one direction or the other until the pointer is in line with the desired number, thereby indicating the selection.

Pawling means are provided to aid the operator in locating the pointer 22 (Figure 11) directly on the selected numeral and the key 140 (Figure 10) in exact alignment with the corresponding selected gear 121 to 129. Pawl 27 is mounted on the front frame plate of the machine by a stud 28 and urged counter-clockwise about said stud by a spring 29 so that a nose 26 thereof is pressed into one of the notches 25 in the member 20. These notches are of the same number and the same distance apart as the numerals 31 to thus facilitate stopping the pointer directly on the selected numeral.

A spring bumper 33, mounted on stud 34 and limited by stud 35, yieldably resists the movement of the setting member past the number one position so that for addition, subtraction, and division correction strokes the operator merely moves the thumb-piece to the right until he feels the resistance of spring 33, which indicates the machine is set in the number one position. The spring 33 will yield, however, and when a zero setting is desired the operator simply applies sufficient pressure to overcome the spring 33.

The plate 20 is also provided with a guide slot 36 (Figure 11) in which the tip 37 of lever 38 (Figure 13) operates. A supporting stud 41 is rigidly secured to the base plate of the machine and a sleeve 39 on stud 41 supports the levers 38 and 42. A channel member or inverted stirrup 45, of the form shown in Figures 12 and 13, overlies the two levers 38 and 42 and embraces the sides of said levers. A hub 54 (Figure 13) is secured to member 45 and a similar hub 51 is fixed to an ear 49 of a cam follower 47, so that when said cam follower rocks to a position shown in Figure 13 the hub 51 abuts hub 54 and positively forces the member 45 downward (Figure 12) to where the levers 38 and 42 become wedged between the divergent sides 19 of member 45, whereupon a rigid unit consisting of lever 38, stirrup 45, and lever 42 can rock about stud 41 and a setting of thumb-piece 21 (Figure 13) will effect a proportionate setting of the key 140 (Figures 12 and 13).

Lever 42 (Figure 13) is formed into an angle and has two oppositely disposed lugs 43 which seat in an annular groove of a collar 44 (Figure 10), which collar slides on shaft 120 and is embraced by the lugs 140—a and 140—b on the left end of key 140, so that as the thumb-piece 21 (Figure 11) is moved to the left, for instance to the number eight position, the collar 44 and key 140 moves a proportionate amount to the right to establish a driving connection between the shaft 120 and gear 128. The operator then makes one turn of the crank 100 to effect an eight actuation, as, for example, if the three key 15 has been depressed, three will be entered into the register eight times.

During the actuating cycle, the key 140 (Figure 10) is locked in alignment with the selected gear and can not be readjusted because the gears 127 and 129 on each side of gear 128 are locked in centralized positions by the arm 143 (Figure 2), as explained hereinbefore. Only when the gear 128 and key 140 nearly complete their revolution will the keyways in all the gears line up so the key can be shifted into alignment with another gear. Therefore, unless means were otherwise provided, it would be necessary for the operator to stop the hand crank in full cycle position and shift the multiplier setting mechanism before he could again turn the crank for a multiplication by the next digit.

Certain mechanisms are thus provided whereby the operator may select the next multiplier digit before the preceding hand crank cycle is completed, so that he can turn the hand crank continuously throughout an entire multiplication problem. A cam 63 (Figures 10 and 13) is secured to shaft 120 and soon after the hand crank is moved out of centralized position one or the other of the camming surfaces 64 rocks the cam follower 47 clockwise. This moves the hub 51 away from hub 54 so that the stirrup may move upwardly when the lever 38 is moved relative to lever 42. It is necessary, however, to provide a certain amount of force tending to urge lever 42 to follow lever 38. For this reason, a spring 46 is compressed between the ear 49 of the cam follower 47 and the top of the stirrup 45, so that there will be a tendency for the stirrup to wedge the two levers into alignment, but if one is prevented from moving when the other is moved the spring 46 will yield. The thumb-piece may, therefore, be reset during the hand-crank cycle while the key 140 and lever 42 are locked, at which time the sides of levers 38 and 42 engage opposite sloping surfaces 19 (Figure 12) and cam the stirrup upwardly. Near the end of the hand-crank cycle as the roller 40 moves down the opposite surface 64, the cam follower 47 is released from restraint of the cam, and a spring 55 which was stressed at the first of the cycle contracts and urges the cam follower counterclockwise. At approximately the same time that cam 63 falls off, the key 140 (Figure 2) moves into alignment with the wide keyways 142 and is free to move to a new setting. The strong spring 55 supplements the spring 46 and exerts additional pressure on the stirrup 45 by forcing hub 51 against hub 54, thereby forcing the lever 42 into alignment with lever 38 as the two levers are wedged between the surfaces 19 in position shown in Figure 12.

Under normal operating speed, the spring 55 exerts sufficient pressure to align the two levers during the interval provided by the slack between the key 140 and the wide keyways 142 (Figure 2). If the operator turns the crank so fast that the key can not move to its new setting under pressure of spring 55 (Figure 13) positive means for this purpose become effective to force the key to the new setting and at the same time to prevent turning the crank through the next cycle until the key is reset. In such a case, the blocking of the hand-crank at the beginning of the next cycle indicates to the operator that he is turning the crank too rapidly. This positive means includes a cam 191 freely mounted on shaft 120 and driven by cam 63 through an ear 192 formed on cam 191, which extends through an aperture 193 in the cam 63. There is a limited amount of slack between the ear and the aperture so the cam 191 may lag behind the cam 63. This slack is provided so that the high point of cam 191 does not engage roller 47ᵃ and rock follower 47 counter-clockwise to the position shown unless the spring 55 fails to do so before the key 140 (Figure 2) moves out of alignment with the keyway 142. Thus, the cam follower 47 is positively rocked to its extreme counter-clockwise position to align the two levers 38 and 42 between each hand-crank cycle and also the crank is prevented from starting the next cycle until the levers are so aligned and the key 140 is set in its new position.

DIVISION FACILITIES

In the register disclosed in the Avery Patent No. 2,222,164, the segments 313 (Figure 23) are rocked and the cam followers 315 (Figure 3) are retracted from their respective cams 281 when the lower carriage is moved into mesh with the actuator. In the present machine this is undesirable because when an overdraft occurs during division it is desired to have the cam followers to cooperate with their respective cams 281 (Figures 3 and 17) to institute a carry wave which moves the numeral wheels in all orders to the left of the highest order of the divisor from zeros to nines in a manner explained hereinafter, which carry wave is used to ring a bell and indicate to the operator that an overdraft has occurred.

During positive actuation, however, it is necessary to rock the cam followers 315 (Figure 3) clear of cams 281 in order to avoid the great resistance to dial rotation that would result if the cam followers were to be simultaneously driven up the steep cam rises in a number of adjoining orders. Means including a cam 60 (Figures 3 and 10) are, therefore, provided to accomplish this. This cam is freely mounted on shaft 166 and is made integral with a gear 62 also free on said shaft and driven by gear 118 keyed to shaft 107. The arrangement is such that cam 60 is rotated through the same angles and in the same direction as crank 100. As can be seen in Figure 3, a clockwise rotation of crank 100 and gear 103 will rotate gear 104 counter-clockwise, gear 105 clockwise, gears 106 and 118 (Figure 10) counter-clockwise, and gear 62 and cam 60 clockwise (Figure 3).

A stud 65 is secured to a frame of the machine and on it are mounted two levers 66 and 70, lever 66 having a downwardly extending arm 69 which follows the cam 60 and is normally held in the position shown in Figure 3 by the spring 68. On the lever 70 is formed an ear 71, which is juxtaposed on the side of arm 69, and a second ear 74 which is formed laterally toward the left side of the machine and designed to operate in the plane of a lever 75. A spring 78 urges lever 70 in a clockwise direction and is limited in that direction by a stationary ear 84. A shaft 80 is disposed laterally in the carriage of the machine and is supported by the lower carriage brace plates 266. One of the levers 75 is keyed to said shaft in each dial order, so that no matter what position the carriage may be in the lateral extension 74 will contact one of the levers 75 and rock the shaft 80 in a clockwise direction when the crank 100 is rotated clockwise.

In division calculations when the crank 100 and cam 60 are rotated in a negative or counter-clockwise direction, the arm 69 will be merely forced clockwise away from ear 71 without imparting any movement to lever 70, and a carry wave of nines will occur immediately the machine is overdrafted instead of waiting until the cam followers 315 are allowed to rock against the cam 281 upon subsequent rising of the carriage, as in the case of the accumulator mechanism disclosed in the last-mentioned Avery patent.

When the present machine is operated negatively until the numeral wheels 279 are reduced to the zero position, shown in Figure 3, the cam followers 315 are rocked the farthest distance from the center of cam 281. If a digit is again subtracted, the dial and its integral cam 281 are rotated clockwise, which allows the roller 316 to move from the extreme high or zero point of the cam to the extreme low or nine position. Ear 314 formed on the segment 313 (Figure 23) underlies the cam follower 315 (Figure 3) so that when said cam follower is released by cam 281, the spring 317 rocks the segment 313 and cam follower 315 clockwise, and coincidentally rocks segment 304 (Figure 23) counter-clockwise. On the segment 304 are mounted the two integral planetary gears 309 and 308 (Figures 18 and 23), and during this counter-clockwise rocking of the segment 304 the gear 309 revolves about the sun gear 280 and the second planetary gear 308 revolves inside the ring gear 301, thus imparting counter-clockwise rotation to spider 300 and its integral sun gear 299.

The planetary gears 298 mesh with both sun gear 299 and ring gear 276, which latter is integral with spider 274 and the numeral wheels 279. Therefore, the counter-clockwise rotation of sun gear 299 imparts clockwise rotation to sun gears 298 about their own centers and clockwise rotation to the next higher order numeral wheel 279 from zero to nine. Secured to this next higher order numeral wheel is also a cam 281 which is rotated to effect a repetition of the movements just described, from that order to the immediate higher order, thus setting up a carry wave to all nines leftward across the carriage.

Figure 17 illustrates the means for ringing the bell when an overdraft occurs. The cam follower 315 in the highest order only is provided with an arm 319a, to which is secured a bell tapper 319, so that when the carry wave reaches the highest order and the cam 281 of that order passes from its zero to nine position, the tapper 319 snaps in a clockwise direction and taps the bell 320 mounted on shaft 1870.

It will be noted that the downwardly extending arm of lever 75 (Figure 3) is removed in Figure 17, and this is because the lateral extension 74 (Figure 3) operates the levers 75 in the first eight orders only. Therefore, levers 75 are formed as shown in Figure 17 in the orders from nine to sixteen.

After the overdraft just described has occurred, it is necessary to rotate the crank handle in a positive direction to return the dials to the left of the highest order of the divisor, to zero before continuing with the division problem. It would be impractical to rotate these dials and their cams 281 (Figure 3) counter-clockwise against the rollers 316. Therefore, means are provided to rock all cam followers 315 clear of the high point of cams 281 during a positive actuation. It will be recalled that the cam 60 is rotated clockwise during positive actuation, during which the arm 69 of the lever 66 is rocked counter-clockwise about stud 65. Ear 71 and lever 70 are thus rocked counter-clockwise and the lateral extension 74 contacts the downwardly extending arm of lever 75 to rock this lever and shaft 80 clockwise. The arms 76 of all of the levers 75 contact the ears 318 and rock their respective cam followers 315 slightly clear of the high points of cams 281 so that any dial may be actuated in a positive direction.

As explained hereinbefore, the cam 60 makes one revolution for every revolution of the hand crank, during which the machine may make from zero to nine actuating cycles, depending upon the setting of the indicator 22 (Figure 1). Therefore, during each hand-crank cycle the cam followers 315 (Figure 3) are held clear of the cams 281 when the crank is turned in a plus direction, irrespective of the number of actuating cycles effected thereby. Likewise, the cam 108 (Figure 3) makes only one revolution for each revolution of the crank 100 and the lower carriage is moved into mesh with the actuator units once during each such hand-crank cycle, irrespective of the number of actuating cycles effected therein.

Means are provided to return the shaft 80 to the position shown in Figure 3 when ear 74 is retracted. At one end of shaft 80 is secured a lever 81 (Figure 17A), which is constantly urged counter-clockwise by spring 79, tensioned between a hole in lever 81 and shaft 264. The only function spring 79 and lever 81 have is to overcome the friction between shaft 80 and the numerous plates 266 which support it, and return the shaft to its normal position, so the arms 76 will not impede the movement of ears 318 during an overdraft.

Counter Mechanism

In calculating machines of this type, it is necessary to provide means for counting the number of times one amount is subtracted from or added to another. For this purpose, a mechanism very similar to the one disclosed in the Avery Patent 2,271,240, is included. As stated hereinbefore, the half-speed shaft 166 (Figures 10 and 27) effects one cycle of digitation for every half-revolution thereof. Therefore, a gear 180 is secured to shaft 166 and meshes with a gear 181 integral with a second gear 182, which drives one of a pair of integral idlers 491 and 492, which transmit the drive directly to gear 1816 (Figures 27 and 28) and through a reverse idler 1820 to gear 1818, which gears may be selectively coupled to the gear 1821 through the counter-reverse unit hereinafter described to effect a drive to the counter finger 1824 in either additive or subtractive direction in exactly the same manner as described in the last mentioned Avery patent. Therefore, for half rotation of shaft 166 the counter finger 1824 actuates the gears 1880 and 1877 one tooth in a direction jointly dependent upon the direction in which shaft 166 is being rotated and upon the setting of the counter-reverse unit. This imparts a one-tooth movement to gear 1879, which corresponds to the gear 273 of Figure 18, and through the planetary gears 298 rotates the dial one-tenth of a revolution or one digit.

Counter Reverse Unit

If a direct drive were established from the actuator shaft 166 (Figure 27) to the shaft 1823 (Figure 28), the dials 1875 could be actuated only in a fixed relation to the direction of shaft 166. Since it is desired to have the relative direction of operations during division opposite to that during multiplication, means are provided whereby the direction in which the dials 1875 (Figure 27) are driven may be selectively controlled.

In Figure 1 the handle 1804 is shown extending through a slot in the top cover with a multiplication and division sign delineated on the top cover. When handle 1804 is at the multiplication setting, both the counter dials 1875 and the product dials 279 rotate in the same direction, either positively or negatively, depending on which direction the crank is rotated, while when the handle 1804 is at the division setting the counter dials 1875 are driven positively, during negative actuation of the dials 279, or vice versa.

Lever 1807 has two lugs 1806 and 1806a (Figure 27) which are journaled in two brackets 1805 and 1805a secured to the frame of the machine to form bearings on which the lever 1807 may be rocked. A leaf spring 1803 is secured to the top cover and retains the lever 1807 in either of the positions to which it is set. On the rear end of lever 1807 is secured a stud 1810 (Figure 28) with an enlarged end 1813 which is received by a key 1812. When the stud 1810 and handle 1804 are in the position shown a direct drive is established from gear 1816 to shaft 1819 and thence through gear 1821 keyed thereto to gear 1822 integral with shaft 1823, which operates the finger 1824 as disclosed completely in the aforementioned Avery Patent No. 2,271,240; it being noted that parts shown herein to which reference numerals are applied but which are not described in detail will be found to bear the same reference numerals in said patent. When the handle 1804 (Figure 1) is shifted to the divide position the stud 1810 and key 1812 are moved to the right, as viewed in Figure 28, to disconnect the drive between gear 1816 and shaft 1819 and establish a drive from gear 1818 to shaft 1819, and thence through gears 1821 and 1822, to effect reverse action of the finger 1824.

SHIFT MECHANISM

The shifting of the carriage in the present machine may be effected by depressing one or the other of the two keys 210 or 211 (Figures 1 and 26). The shift-controlling mechanism described hereinafter is claimed in my copending application, Serial No. 494,214, filed July 10, 1943. Each key is mounted on the usual slidable key stem 212 and 213, respectively, and is maintained in its raised position by a spring 214 tensioned between an ear on the key stem and a stationary stud 215 on which the key stem slides. The bottom of the stem 213 and an arm 216 of the key stem 212 overlie a lateral extension 217 formed on the forwardly extending arm of bell-crank 220. Depression of either shift key thus rocks the bell crank counter-clockwise about stud 221 and effects a carriage shift in the following manner. On the upwardly extending arm of bell-crank 220 are two studs 219, which guide an adjustable extension 222 on which is laterally formed an ear 223.

Two identical levers 225 and 226 (Figures 24, 25, and 26) are freely mounted on a vertical shaft 227, and on the left end of each is mounted a roller 228 and 229 (Figure 25), one of which rollers lies in the path of ear 223 (Figure 26) when extension 222 is in either its extreme high or low position. On the right end of levers 225 and 226 are rollers 231 and 232, respectively, so positioned as to actuate a pair of shift cams 233 and 234.

It will be noted on viewing Figure 24 that the cam 234 is rotated clockwise when the roller 232 engages the curved surfaces 235, until said roller reaches one of the low points 236 of the cam. In this position, the top of the next lobe has revolved to a position where it lies in the path of roller 232 upon return movement thereof to the position shown. Therefore, the cams are both loosely keyed to a hub 237 (Figure 24), secured to the shaft 240, and urged in opposite directions to the positions shown by a torsion spring 238 (Figures 25 and 26). This allows the cams 233 and 234 to back away a limited amount during the return movement of the rollers and to snap back to their driving position, where the next lobe lies in the path of its respective roller.

On the upper end of shaft 240 is secured a disc 333 (Figure 26), on which are mounted three rollers 332 which successively engage between the teeth of the rack 330 (Figure 22) and traverse the carriage 250 as they revolve about shaft 240 in the manner described in the Avery Patent No. 2,271,240.

Means are provided to centralize the shaft 240, so it will not follow the cams 233 and 234 when they back away against the torque of spring 238 and so the carriage and cams 233 and 234 will not float out of position during actuation or periods when the machine is idle. On shaft 240 (Figures 21 and 26) is secured a three lobe cam 243, against which is pressed a roller 244 mounted on an arm 245 and maintained against the cam by spring 246, tensioned between the arm 245 and a stationary member of the machine. When the shaft 240 is rotated during a shifting operation the spring 246 yields and the roller 244 is moved away by one of the lobes of cam 243 as it revolves and then reseats in the next recess of the cam 243 to retain the shifting mechanism in a centralized position until again actuated.

The means provided to control the direction in which the carriage is shifted consists of a bell crank 248 (Figure 26), freely pivoted on stud 247, and having two arms 251 and 252 which normally underlie the ears 253 on each key stem 212 and 213, so that when a key 210 or 211 is depressed one of the ears 253 contacts the arm 251 or 252 and rocks the bell crank 248 either clockwise or counter-clockwise depending upon the key depressed. Also, mounted on the stud 247 and secured to bell-crank 248 is an arm 254 having a bifurcation at the right end thereof, which embraces the stud 255a of a lever 255, said lever being pivoted on the stud 256 and provided with two opposing lugs 257. Adjacent lever 255 and freely pivoted on stud 256 is a second lever 190, also with two opposing lugs 257, and a spring 192 is compressed between the four lugs, thus making the two levers 255 and 190 yieldably connected.

Pivoted on a stud 261 is a pawl 263 provided with a nose 265, adapted to seat in one of the three notches 268 and retain lever 190 in its adjusted position. A spring 267 is tensioned between the rearwardly extending arm of pawl 263 and shaft 269 and urges the nose 265 against a notch 268, but may yield and allow the lever 190 to be readjusted to either of the other two positions.

The lever 255 has a second stud 258 secured to a rearwardly extending arm thereof, which is embraced by the bifurcation 196 of a lever 195 pivoted on a stud 197. A second bifurcation 198 of lever 195 embraces a stud 224 on the extension 222, so that when lever 190 is set to the right, as viewed in Figure 26, the lever 255 rocks clockwise about stud 256 to effect upward movement of the extension 222 until its ear 223 is aligned with roller 228, whereupon counter-clockwise rocking of the bell-crank 220 effects a carriage shift to the right.

A carriage traversal in the same direction will be effected if key 210 is depressed, as will be seen in viewing Figure 26 where ear 253 of key stem 212 in its downward movement rocks bell-crank 248 counter-clockwise, which coincidentally rocks lever 254 and imparts the same rocking movement to lever 255 that was effected by setting lever 190 to the right.

Obviously, a setting of the lever 190 to the extreme left or the depression of the key 211 through the reverse action of the linkage just described will effect the lowering of the extension 222 to where its ear 223 is aligned with roller 229, in which position a shift to the left will result upon subsequent rocking of bell-crank 220.

Means are provided to lock one of the keys 210 or 211 in a raised position when the other is depressed, so that both keys cannot be depressed at once. As just described, the ear 253 in passing downwardly rocks the bell crank 248, and in so doing the arm that rises abuts the underneath surface of the ear 253 of the other key stem to lock the second key in a raised position until the first one is released and returned by its spring 214.

There is some distance between the bottom of the key stems 212 and 213 (Figure 26) and the ear 217, and this is provided to allow the ear 223 to be positioned before the bell crank 220 is rocked to actuate a shifting operation.

Means are also provided to traverse the carriage automatically by power derived from the hand crank, and this is done so smoothly by the mechanism disclosed herein that the idle period between the actuating phase and the end of the cycle will suffice for shifting the carriage. The shaft 120 (Figure 10) runs transversely in the machine and on its extreme left end is secured an arm 284 (Figure 26) which always rotates with shaft 120, and adjacent arm 284 is a shift actuating cam 282 which is freely rotatable on a hub of arm 284. Said cam is in the plane of a roller 218 and has mounted thereon a pin 283 which lies in the path of arm 284.

If arm 284 is rotated in a clockwise direction, as shown in Figure 26, it will not contact the stud 283 until it has completed approximately eighty-seven and one-half per cent. of its complete revolution, and as described hereinbefore, by this time the actuation is complete and the carriage begins to rise. As the arm 284 completes its circuit, it carries the cam 282 past center, during which time the bell crank 220 is rocked counter-clockwise to actuate a shift in a selected direction. If the arm 284 is rotated in the opposite or counter-clockwise direction, it picks up the cam at about one-eighth of a rotation, but the cam will not begin to rock the bail 220 until it has moved approximately 270°; therefore, the shift will be actuated during the last one-eighth turn for this reverse direction also.

AUTOMATIC SHIFT DIRECTION CONTROL

When performing division problems on the present machine, it is proposed to estimate the quotient and set the estimation in the selective transmission by adjusting the thumb-piece 21 (Figure 1), and then rotate the crank in a negative direction. The estimation will not always be right and it may be necessary to make one or two correction strokes before the correct quotient digit is obtained. From the foregoing description of the shift mechanism it will be remembered that every time the crank is rotated the cam 282 rotates to effect a carriage shift.

It is necessary therefore to disable this shift actuating mechanism during the trial strokes in division, and it may be done by adjusting the shift direction control lever 190 (Figure 26) to its intermediate or non-shift position (Figure 1). When in this position ear 223 is positioned as shown in Figure 26, so that when the bell crank 220 is rocked to actuate a shift the ear 223 passes between rollers 228 and 229 without effecting a carriage traversal.

When the correct quotient digit is obtained, however, a shift to the left may be automatically initiated by setting the thumb-piece 21 to zero, and rotating the crank once in either direction.

The zero shift cam 10 (Figure 26) is loosely keyed on shaft 120 and is shown in Figure 10 located on said shaft next to the number one selection gear 121, and has a centralizing disc 141 secured thereto, so that when key 140 is moved to the left to connect shaft 120 with the zero shift cam, all other selections are locked in the same manner as was described under the section headed "Selective ratio transmission."

In the plane of cam 10 is a roller 11 (Figure 26) mounted on an arm 12, secured to the right end of a laterally disposed shaft 269. A second arm 13 is secured to the left end of said shaft and has a stud 14 which moves in the plane of lever 195. A spring 17 is tensioned between arm 13 and bell crank 220 to maintain said bell crank in a clockwise position and to hold roller 11 against cam 10. When lever 190 (Figure 26) is set to its non-shift position shown, a tip 199 of lever 195 lies in the path of stud 14 so that when cam 10 is rotated cam follower 12, shaft 269, and arm 13 all rock counter-clockwise, and stud 14 engages the tip 199 and rocks lever 195 clockwise about stud 197, all of which sets the shift direction control mechanism for a shift to the left. If the lever 190 (Figure 26) is moved rearwardly (Figure 1), opposite the arrow indicating a setting for a carriage shift to the right, the tip 199 of lever 195 is moved rearwardly and out of the path of stud 14, so that in this case cam 10 will have no effect upon the shift setting mechanism. Also if the lever 190 is moved forwardly opposite the arrow indicating a setting for a carriage shift to the left, the tip 199 is moved beyond the point which stud 14 reaches at the height of its movement, thus rendering the action of cam 10 ineffective during this setting.

Figure 19 shows the means for disconnecting the carriage from the shift driving mechanism and is identical to that disclosed in the Avery Patent No. 2,271,240, in which it is completely described how the depression of handle 336 of lever 335 rocks the shift rack 330 clear of rollers 332 so that the carriage may be freely traversed in either direction by lateral hand pressure against handle 336.

DIAL CLEARANCE MECHANISM

Means are provided to selectively return to zero either the counter dials 1875 (Figure 1) or the product dials 279, or both, by depressing either of the juxtaposed keys 286 or 285, respectively, or both. Key 286 (Figure 1), adapted to effect clearance of the counter dials 1875, is secured to key stem 351 (Figure 30), which is slidably mounted on shafts 352 and 353 in the usual way, and has an ear 354 formed laterally thereon. A lever 355, underlying ear 354, is freely pivoted on a stationary stud 356 and has a roller 357 mounted on the right end thereof which lies in the leftward path of an ear 358 formed on a lever 359, mounted for rotation with shaft 360. A strong spring 361 is tensioned between a stationary stud 362 and a stud 363 secured to lever 359, whereby lever 359 is constantly urged in a counter-clockwise direction on shaft 360, but is restrained by roller 357. A stud 364, secured to the upper end of lever 359, is retained within an L-shaped aperture 366 of link 365 by a washer 364ª made integral with said stud. Stud 364 is normally disposed in the perpendicular leg of said aperture, so that when key 286 is depressed and roller 357 is raised out of the path of ear 358, spring 361 is free to rock lever 359 and stud 364 to the left, whereupon said stud engages the left edge of the perpendicular leg of said aperture and carries link 365 to the left with it. A stud 367 connects the right end of link 365 to a lever 368 mounted for rotation with a shaft 369 and a second lever 370 also secured to said shaft. A link 371 connects lever 370 with lever 372 made integral with a sleeve 373 through which clear shaft 260 may slide.

When link 365 is thus moved to the left the integral unit 368, 369 and 370 is rocked clockwise, which effects downward movement of link 371 and clockwise rocking of link 372 and sleeve 373. As explained in the Avery Patent No. 2,291,135, shaft 260 moves laterally with the carriage as it shifts from order to order and may be rocked about its center in any decimal position thereof by sleeve 373 and lever 372 to return all counter dials to zero. It may also be found in said patent that when shaft 260 is rocked during clearance operations, it acts against a plurality of springs provided in the carriage for other reasons; therefore, spring 361 must be strong enough to overcome the combined strength of these springs. Furthermore, shaft 260 must be free to return to the position shown after the dials have been cleared before subsequent values may be entered into the dials.

Means are therefore provided to automatically break the train from the spring 361 to shaft 260, so the machine may again be operated before spring 361 is recocked. Link 365 is provided with a camming surface 365ª which, when moved to the left, rides over a stationary stud 374 near the end of the clearance stroke, whereupon lever 365 is cammed upwardly and the horizontal leg of aperture 366 is aligned with stud 364. The aforementioned carriage springs may then return shaft 260 and link 365 to the position shown in Figure 30, while lever 359 remains in its extreme counter-clockwise position with stud 364 lying in the left end of the aperture 366.

The product dials 279 may be restored to zero by depression of key 285, which functions to effect rocking of shaft 259. This key is secured to the top of a key stem 285ª and is similarly adapted for up and down movement on shafts 352 and 353. An ear 375 is formed on said key stem and overlies the left end of a lever 376 pivoted on stationary stud 377. A hook 379 is provided on the right end of lever 376 and normally blocks rightward movement of lever 380 connected to the left end of a link 383, the right end of which is fastened to a lever 386, keyed to shaft 259 by means of sleeve 387 similar to the construction relative to shaft 260. A spring 388 is tensioned between stud 381 and stud 389 secured to the frame of the machine, and is adapted to rock lever 380 clockwise about its supporting stud 415 unless blocked by hook 379.

When it is desired to clear the dials 279 the operator depresses key 285 which rocks lever 376 counter-clockwise and frees lever 380. Stud 381 normally lies in the perpendicular leg of aperture 382 so that when said lever rocks under the urge of spring 388 it forces link 383 to the right and lever 386, sleeve 387, and shaft 259 counter-clockwise to effect clearance of the product dials in a manner described in the aforementioned Avery patent. Since spring 383 overcomes the springs associated with the dials in the carriage during clearance, this train must also be broken near the end of the clearance stroke so that the shaft 259 and associated clearance mechanism may return to the position shown in Figure 30 before spring 388 is recocked.

This break in the train is effected in a manner similar to that described in connection with the clearance of the upper dials. Link 383 is provided with a camming surface 384, which rides over stationary stud 385 during the rightward movement thereof. In so doing, lever 380 is cammed upwardly with respect to stud 381 at such a time that the horizontal leg of aperture 382 is aligned with said stud at approximately the end of the clearance stroke, thus allowing link 383, shaft 259, and related clearance mechanism to return to the position shown, while lever 380 remains in its extreme clockwise position with stud 381 resting in the right end of aperture 382. By this provision, the product dials are freed for subsequent operation before spring 388 is recocked.

Means are provided to recock springs 388 and 361 incidental to the first turn of the crank 100 during the subsequent calculation, and since the recocking load is considerable, arrangements are made to spread the work out over the majority of the ensuing cycle, which, combined with the fact that the ensuing calculation may be either positive or negative, requires that separate means must be provided to effect this recocking in either direction of rotation of the crank 100. Two cams 390 and 391 are freely mounted on the hand crank shaft 102 (Figures 10, 29, and 30) and are provided with dogs 392 and 393 pivotally mounted thereon, which cooperate with a notched sleeve 394 mounted for rotation with shaft 102; said dogs being urged against said sleeve by compression springs 395 and 396. When crank 100, shaft 102 and sleeve 394 are turned in a positive or clockwise direction, the notch 394ᵃ engages and drives the pawl 392 and its associated cam 390 while the cam 391 remains stationary. When, however, crank 100 is turned in a negative or counterclockwise direction, the notch 394ᵇ engages the pawl 393 and drives the cam 391 while the pawl 392 slips and the cam 390 remains stationary.

Two cam followers 400 and 401, freely mounted on stud 415, Figure 30, and urged clockwise by two springs 402 and 403, are provided with rollers 400ª and 401ª (Figure 29). Each roller lies in the plane of its respective cam so that upon rotation thereof the corresponding cam follower is rocked counter-clockwise about stud 415 (Figure 30). A stud 407 is mounted on lever 380 and extends through the planes of cam followers 400 and 401 so that upon rocking of either of said cam followers the left surface thereof engages the stud 407 and rocks lever 380 to the left, at which time stud 381 moves to the left end of aperture 382, whereupon link 383 is allowed to drop to the position shown in Figure 30 when stud 381 is aligned with the perpendicular leg of said aperture. During the leftward movement of lever 380 roller 378 engages the diagonal surface of hook 379 and rocks it upwardly against the tension of spring 408 until it reaches its extreme leftward position, at which time said hook drops behind roller 378 and retains the product dial clearance mechanism in the position shown until key 285 is again depressed.

At the same time the product dial clear actuating lever 380 is recocked, the counter dial clear lever 359 is also recocked. Each cam follower 400 and 401 is provided with an arm 404 which underlies a stud 405 mounted on a lever 406 secured to shaft 360. The stud 405 extends through the planes of cam followers 400 and 401, so that when either of said cam followers is rocked, lever 406, shaft 360 and lever 359, also secured to said shaft, are rocked clockwise; whereupon stud 364 moves to the right end of aperture 366 and allows link 365 to drop when said stud becomes aligned with the perpendicular leg of said aperture. When lever 359 reaches its extreme rightward position, roller 357 drops in front of ear 358 under the urge of spring 409 and renders the counter dial clearance mechanism ineffective until key 286 is again depressed.

MODIFIED EMBODIMENT

The mechanism shown in Figures 31 and 32 constitutes an alternative arrangement for rocking the carriage into engagement with the actuator and holding it there for a plural cycle operation, and for rocking and holding the dial cam followers 315 (Figure 32) away from the dial cams 281 so the cam followers will not be driven up the steep rise of the cams when the dials are driven in a plus direction.

The present arrangement, briefly, includes two primary interlocking elements driven by the hand crank. If both elements are simultaneously centralized they release the carriage and cam followers. A spring normally holds the two elements in alignment, but is overcome when the machine is operated so that one element lags behind the other as long as the normal operating speed is maintained and thus prevents release of the carriage and cam followers. When the machine is stopped, however, in a centralized position, the spring aligns the two elements which then release the carriage and cam followers.

This modification is shown as embodied in the machine described in the first embodiment; to which reference may be had for a description of the mechanism not specifically disclosed hereinafter. Two cams 500 and 520 (Figures 31, 32, and 33) and a gear 530 are riveted into an integral unit freely rotatable on the half speed shaft 166. Gear 530 is driven by gears 531 and 133 (Figure 31), the latter of which corresponds to the gear of the same number in Figure 10 and is described in the first embodiment. The shaft 130, which drives gear 133, is driven according to the setting of the selective speed transmission shown in Figure 10 and therefore drives the cams 500 and 520 a selectively variable number of cycles during each revolution of the hand crank 100.

Early in the first cycle or the first half revolution of shaft 166 in a plus or clockwise direction, the cam 500 rocks all the dial cam followers clear of the cams 281, and cam 520 serves as one of the two interlocking elements, briefly described above, for holding the cam followers in their rocked position for a plurality of cycles. Considering first the cam 500, it can be seen in Figure 32 that it has two shoulders 501 and 502, either of which is adapted when driven in a plus direction to engage an ear 503 of a lever 504, pivoted to a plate 505 by a stud 506. Lever 504 is urged counter-clockwise about stud 506 by a spring 507 and is limited in that direction by an ear 508. Plate 505, freely pivoted on a stud 509 and urged to the position shown by spring 510, has an ear 511 which is formed across the plane of one of the levers 76. Lever 76 corresponds to the lever of the same number in Figure 3 and as explained in the first embodiment there is one such lever keyed to the shaft 80 in each dial order, so that irrespective of the lateral position of the carriage, one of said levers is in line with the ear 511. Thus when the cam 500 rocks plate 505, the ear 511 engages an arm 512 of one of the levers 76 and rocks shaft 80 clockwise, carrying with it all levers 76. Each lever 76 engages an ear 318 on its associated dial cam follower and rocks the roller 316 clear of the cam 281.

At the same time cam 500 rocks plate 505 counter-clockwise, the cam 520 rocks cam follower 517 clockwise about stud 518. An ear 516, formed on the cam follower, extends through an aperture 515 in the plate 505 and is moved rearwardly at the same time the plate is rocked counter-clockwise. The ear 516 thus engages the diagonal surface 515a of the aperture and cams the plate further counter-clockwise than it would otherwise be moved by cam 500. This carries the ear 503 on an arc about shaft 509 above the shoulders of cam 500 to prevent a rasping noise and wear on the parts when the shoulders on the cam pass under the ear 503. As long as the ear 516 remains in the lower notch of the aperture, the cam followers 315 will be held clear of the dial cams.

During negative operation, the cam 500 rotates in a counter-clockwise direction and the lever 504 is rocked upwardly without imparting any movement to plate 505, so that when the cam follower 517 is rocked the ear 516 moves into the upper notch of aperture 515.

At the same time the dial cam followers are rocked, the carriage is moved into mesh with the actuator by means of a stud 514, which is mounted on the cam follower 517 so that downward movement thereof rocks arm 513, shaft 115, and arm 116 counter-clockwise to lower the carriage as explained hereinbefore.

The actuator is driven by the same train which drives the cams 500 and 520, but its start is delayed until the carriage is lowered into mesh therewith. An actuator driving member 525 (Figures 31 and 33) is secured to the actuator half-speed shaft 166, corresponding to the shaft of the same number in Figure 10, and has an ear 525 extending laterally through an aperture 527 in the cam 520. A spring 521 compressed between opposing lugs 521a in the cam 520 and driving member 525 normally maintains said cam and driving member in alignment. As explained in the first embodiment, the shaft 166 is held in the centralized position shown in Figure 15 by means including the roller 178 which blocks rightward movement of arm 157. When the carriage is lowered, however, by cam 520 (Figure 31) the lever 171 (Figure 15) is rocked counter-clockwise, which moves roller 178 to the position 178a to release arm 157 so it can be driven toward the right by centralizer 153 and shaft 166. The driving member 525 (Figure 31) is therefore held until the roller 178 is moved clear of lever 157, at which time one end of the aperture 527 engages the ear 526 and positively drives the actuator shaft 166.

Thus there are two primary interlocking elements, namely, cam 520 and centralizer 153, for locking the carriage in lowered position, each having a full cycle or centralized position in which they can release the carriage. When the cam 520 (Figure 31) completes its first cycle or half revolution and the opposite notch lines up with the roller 519 to release the cam follower 517 and the carriage, the shaft 115 is locked by the centralizer 153 (Figure 15) which has not yet reached its full cycle position. Therefore, the roller 519 on cam follower 517 is prevented from following cam 520 into the notch and instead remains in its clockwise position. By the time the centralizer 153 reaches the full cycle position, shown in Figure 15, to release the carriage the cam 520 (Figure 31) has passed full cycle position and holds the carriage.

By means of this overlapping of full cycle positions, the levers 505, 76 and cam followers 315 are maintained in their locked position and the carriage is held in its lowered position until the cam 520 is stopped at full cycle position to allow spring 521 to expand and move the actuator shaft 166 into alignment with said cam.

When the two interlocking elements are thus aligned the carriage is released by both elements simultaneously and allowed to rise under influence of its plurality of internal springs, explained hereinbefore, and in the Avery Patent No. 2,271,240. At this same time, ear 516 also moves to the position shown in Figures 31 and 32 and releases plate 505 and the dial cam followers 315.

TYPICAL METHODS OF USE IN CALCULATION

Addition and subtraction are performed on the present machine in a way which is not new to the art and, therefore, need not be explained.

However, during multiplication the operator of an old type of machine sets up the multiplicand on the keyboard and turns the crank as many times as the first or last digit of the multiplier indicates, shifts the carriage to the left or right, and then repeats the process according to the following digits of the multiplier.

In the present machine, however, the multiplicand is set into the keyboard, the lever 190 (Figure 1) is set to whichever direction the operator is accustomed to shift the carriage during multiplication, and the thumb is placed in the rest or thumb-piece 21 and moved to the number corresponding to the first or last digit of the multiplier (depending on the direction of shift selected), the crank is then turned once, which multiplies the number set in the keyboard by the number the arrow 22 points to, and shifts the carriage, all in one cycle of the crank 100. For rapid multiplication the operator may reset the arrow 22 to the next succeeding multiplier digit before he is finished turning the crank for the last setting.

In division the operator of an older type machine subtracts the divisor from the dividend by rotating the crank in a negative direction until the machine overdrafts, which may require as many as ten turns of the crank, then it is necessary to turn the crank once in a positive direction to correct the overdraft, and then shift to the next order and repeat the process.

On the present machine, however, after it is seen that lever 1804 (Figure 1) is in its division position and lever 190 is in its non-shift or neutral position, and the dividend and divisor are set into the machine in the regular way, the operator estimates the first quotient digit by comparing the first one or two digits of the dividend and divisor, and after setting the pointer 22 to his estimation he then turns the crank once.

If his estimation was too high, the machine will overdraft, which will be indicated by a bell. In this event, it is necessary to adjust the pointer 22 to one and turn the crank in a plus direction until the nines in the register resulting from the overdraft are restored to zero. The pointer is then moved to its zero position and the crank turned once to actuate the shift mechanism. If, however, the operator's estimation was too low, he performs the same sequence of operations except that he turns the crank in a negative direction during the correction cycle.

If his estimation is correct, he merely moves the pointer to zero and turns the crank for a shift and then repeats the process in the next order.

This machine, therefore, contributes much to speed in the solution of multiplication and division problems by saving an average of four turns of the crank in each denominational order of the multiplier factor, and an average of five turns in each order of the quotient factor. In addition to this, the operator does not have to move his hands from one control member to another during shifting operations but instead can concentrate on the reading in the register without having to press or turn a separate shift control member.

I claim:

1. A mechanism for operating the actuator of the numeral wheels of a calculating machine, said mechanism including a selective ratio transmission having a driving phase and an idle phase, an element movable for selecting the ratio of said transmission to be utilized, a member for moving said element, means for locking said element during the driving phase of said transmission, a yielding connection between said member and said element for permitting movement of said member while said element is locked, and a spring means operative during the idle phase of said transmission to move said element to the position corresponding to that of said member, and means operative during the idle phase of said transmission to increase the force of said spring means.

2. A mechanism for operating the actuator of the numeral wheels of a calculating machine, comprising a selective ratio transmission and a driving member for driving said transmission through cycles having a driving phase and an idle phase in each of said cycles, said transmission including a drive shaft having a series of gears freely rotatable thereon, an element movable for connecting a selected one of said gears to said drive shaft, means for locking said element during the driving phase of said transmission, a member for moving said element, a yieldable connection between said member and said element for permitting the member to be moved while said element is locked, and spring means operative during an idle phase of said transmission to move said element to the position corresponding to the position of said member.

3. A mechanism for driving the actuator of the numeral wheels of a calculating machine, which mechanism includes a transmission having a plurality of gear trains of different gear ratios to be selectively utilized, the gears of said trains being formed to provide driving and idle phases, an element movable for selecting the gear train to be utilized, a member for moving said element, a yieldable connection between said member and element, spring means for moving said element during the idle phase of said transmission in accordance with the movement of said member, and a cam operative to render said spring means ineffective during the driving phase of said transmission.

4. A mechanism for driving an actuator of the numeral wheels of a calculating machine, which mechanism includes a selective ratio transmission having a plurality of gear trains of different gear ratios formed to provide driving and idle phases, an element movable for selecting the gear train to be utilized, a settable member for moving said element, means for locking said element during the driving phase of said transmission, a yielding connection between the settable member and element for permitting movement of said member to a new setting while said element is locked, and means including a cam driven by said transmission for forcing said element to the position corresponding to the new setting of the settable member during the idle phase of said transmission.

5. In a calculating machine having a register and an actuator therefor, a selective ratio transmission for driving said actuator, said transmission having a plurality of gear trains of different ratios and being designed to provide a driving phase and an idle phase, an element movable for selecting the gear train of said transmission to be utilized, a settable member for moving said element, means for locking said element during said driving phase, a yieldable connection between the settable member and element for permitting movement of said member to a new setting while said element is locked, spring means for yieldingly moving said element to the position corre-